(12) United States Patent
Milam et al.

(10) Patent No.: US 8,597,498 B2
(45) Date of Patent: *Dec. 3, 2013

(54) PROCESS FOR TREATING A HYDROCARBON-CONTAINING FEED

(75) Inventors: Stanley Nemec Milam, Houston, TX (US); Michael Anthony Reynolds, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/010,938

(22) Filed: Jan. 21, 2011

(65) Prior Publication Data

US 2011/0174688 A1  Jul. 21, 2011

Related U.S. Application Data

(60) Provisional application No. 61/297,067, filed on Jan. 21, 2010.

(51) Int. Cl.
| | |
|---|---|
| *C10G 47/06* | (2006.01) |
| *C10G 47/02* | (2006.01) |
| *C10G 47/24* | (2006.01) |
| *C10G 47/26* | (2006.01) |

(52) U.S. Cl.
USPC ............. 208/112; 208/46; 208/106; 208/107; 208/108; 208/121; 502/100; 502/216; 502/220; 502/221; 502/300

(58) Field of Classification Search
USPC ........... 208/106, 107, 108, 46, 112, 113, 121; 502/100, 216, 220, 221, 300
See application file for complete search history.

(56) References Cited

U.S. PATENT DOCUMENTS

| | | | |
|---|---|---|---|
| 2,159,511 A | 5/1939 | Pier et al. | |
| 3,458,433 A | 7/1969 | Wood et al. | ..................... 208/89 |

(Continued)

FOREIGN PATENT DOCUMENTS

| | | | |
|---|---|---|---|
| CA | 1248514 | 1/1989 | ............... B01J 21/18 |
| EP | 0133031 | 2/1985 | ............. C10G 45/08 |

(Continued)

OTHER PUBLICATIONS

Parkash, S, Refining Processes Handbook, 2003, Gulf Prof. Publishing, pp. 62-108.*

(Continued)

*Primary Examiner* — Walter D Griffin
*Assistant Examiner* — Derek Mueller

(57) ABSTRACT

A process for treating a hydrocarbon-containing feedstock is provided in which a hydrocarbon-containing feed comprising at least 20 wt. % of heavy hydrocarbons is mixed with hydrogen, hydrogen sulfide, and a metal-containing catalyst to produce a hydrocarbon-containing product. The hydrocarbon-containing feedstock, the catalyst(s), the hydrogen sulfide, and the hydrogen are provided to a mixing zone and blended in the mixing zone at a temperature of from 375° C. to 500° C. and a total pressure of from 6.9 MPa to 27.5 MPa, where hydrogen sulfide is provided at a mole ratio of hydrogen sulfide to hydrogen of at least 0.5:9.5 and the combined hydrogen sulfide and hydrogen partial pressures provide at least 60% of the total pressure. A vapor comprised of hydrocarbons that are vaporizable at the temperature and pressure within the mixing zone is separated from the mixing zone, and, apart from the mixing zone, the vapor may be condensed to produce a liquid hydrocarbon-containing product.

20 Claims, 4 Drawing Sheets

(56) References Cited

U.S. PATENT DOCUMENTS

| | | | |
|---|---|---|---|
| 3,904,513 A | 9/1975 | Fischer et al. | 208/264 |
| 3,951,781 A | 4/1976 | Owen et al. | |
| 3,974,062 A | 8/1976 | Owen et al. | |
| 4,208,271 A | 6/1980 | Cosyns et al. | 208/255 |
| 4,243,553 A | 1/1981 | Naumann et al. | 252/439 |
| 4,243,554 A | 1/1981 | Naumann et al. | 252/439 |
| 4,424,142 A | 1/1984 | Asaoka et al. | 502/84 |
| 4,425,278 A | 1/1984 | Wirth et al. | 260/429 R |
| 4,454,024 A | 6/1984 | Singhal et al. | 208/111 |
| 4,460,698 A | 7/1984 | Hensley, Jr. et al. | |
| 4,510,260 A | 4/1985 | Stiefel et al. | 502/219 |
| 4,514,517 A | 4/1985 | Ho et al. | 502/220 |
| 4,547,321 A | 10/1985 | Stiefel et al. | 556/14 |
| 4,557,821 A * | 12/1985 | Lopez et al. | 208/108 |
| 4,581,125 A * | 4/1986 | Stiefel et al. | 208/108 |
| 4,596,785 A | 6/1986 | Toulhoat et al. | 502/220 |
| 4,626,339 A | 12/1986 | Chianelli et al. | 208/18 |
| 4,632,747 A | 12/1986 | Ho et al. | 208/18 |
| 4,650,563 A | 3/1987 | Jacobson et al. | 208/108 |
| 4,666,878 A | 5/1987 | Jacobson et al. | 502/221 |
| 4,668,376 A | 5/1987 | Young et al. | 208/108 |
| 4,695,369 A | 9/1987 | Garg et al. | 208/112 |
| 4,698,145 A | 10/1987 | Ho et al. | 208/18 |
| 4,721,558 A | 1/1988 | Jacobson et al. | 208/108 |
| 4,724,068 A | 2/1988 | Stapp | 208/213 |
| 4,748,142 A | 5/1988 | Chianelli et al. | 502/220 |
| 4,755,496 A | 7/1988 | Ho et al. | 502/165 |
| 4,792,541 A | 12/1988 | Ho et al. | 502/167 |
| 4,795,731 A | 1/1989 | Pecoraro et al. | 502/221 |
| 4,801,570 A | 1/1989 | Young et al. | 502/220 |
| 4,820,677 A | 4/1989 | Jacobson et al. | 502/220 |
| 4,824,820 A | 4/1989 | Jacobson et al. | 502/219 |
| 4,897,178 A | 1/1990 | Best et al. | |
| 5,158,982 A | 10/1992 | Stapp | 521/41 |
| 5,186,818 A | 2/1993 | Daage et al. | 208/254 H |
| 5,296,130 A * | 3/1994 | Kriz et al. | 208/107 |
| 5,332,489 A | 7/1994 | Veluswamy | 208/56 |
| 5,382,349 A | 1/1995 | Yoshita et al. | 208/49 |
| 5,484,755 A * | 1/1996 | Lopez | 502/219 |
| 5,872,073 A | 2/1999 | Hilsenbeck et al. | 502/220 |
| 5,985,782 A | 11/1999 | Wilson et al. | |
| 6,248,687 B1 | 6/2001 | Itoh et al. | 502/216 |
| 6,623,623 B2 | 9/2003 | Kalnes | 208/89 |
| 7,214,309 B2 | 5/2007 | Chen et al. | 208/111.3 |
| 7,238,273 B2 | 7/2007 | Chen et al. | 208/49 |
| 7,396,799 B2 | 7/2008 | Chen et al. | 502/216 |
| 7,402,547 B2 | 7/2008 | Wellington et al. | 502/222 |
| 7,410,928 B2 | 8/2008 | Chen et al. | 502/216 |
| 7,416,653 B2 | 8/2008 | Wellington et al. | 208/108 |
| 7,431,822 B2 | 10/2008 | Farshid et al. | 208/57 |
| 7,431,824 B2 | 10/2008 | Chen et al. | 208/108 |
| 7,431,831 B2 | 10/2008 | Farshid et al. | 208/423 |
| 7,763,160 B2 | 7/2010 | Wellington et al. | 208/14 |
| 7,811,445 B2 | 10/2010 | Wellington et al. | 208/14 |
| 7,828,958 B2 | 11/2010 | Wellington et al. | 208/14 |
| 7,854,833 B2 | 12/2010 | Wellington et al. | 208/108 |
| 7,879,223 B2 | 2/2011 | Wellington et al. | |
| 2005/0269245 A1 | 12/2005 | Huve | |
| 2006/0058174 A1 | 3/2006 | Chen et al. | 502/3 |
| 2006/0157385 A1 | 7/2006 | Montanari et al. | 208/49 |
| 2007/0102321 A1 | 5/2007 | Wang | |
| 2007/0102322 A1 | 5/2007 | Wang | |
| 2007/0138055 A1 | 6/2007 | Farshid et al. | 208/49 |
| 2007/0138057 A1 | 6/2007 | Farshid et al. | 208/57 |
| 2007/0140927 A1 | 6/2007 | Reynolds | 422/140 |
| 2007/0238607 A1 | 10/2007 | Alonso et al. | 502/177 |
| 2008/0105595 A1 | 5/2008 | Koseoglu | |
| 2008/0135450 A1* | 6/2008 | Reynolds et al. | 208/108 |
| 2008/0305947 A1 | 12/2008 | Chen et al. | 502/217 |
| 2009/0008291 A1* | 1/2009 | Chabot et al. | 208/57 |
| 2009/0011931 A1 | 1/2009 | Chen et al. | |
| 2009/0023965 A1 | 1/2009 | Pereira et al. | |
| 2009/0057193 A1 | 3/2009 | Farshid et al. | 208/56 |
| 2009/0057194 A1 | 3/2009 | Farshid et al. | 208/56 |
| 2009/0057195 A1 | 3/2009 | Powers et al. | 208/59 |
| 2009/0065398 A1 | 3/2009 | McConnachie et al. | |
| 2009/0313890 A1 | 12/2009 | Lopex et al. | |

FOREIGN PATENT DOCUMENTS

| | | | |
|---|---|---|---|
| EP | 145105 | 6/1985 | |
| EP | 0546686 | 6/1993 | C10G 47/02 |
| FR | 2130297 | 3/1972 | C10G 37/00 |
| GB | 630204 | 10/1949 | |
| GB | 786451 | 7/1955 | |
| GB | 1281265 | 7/1972 | |
| JP | H08199173 | 8/1996 | C10G 47/02 |
| WO | WO8603694 | 7/1986 | |
| WO | WO9806795 | 2/1998 | |
| WO | WO2005001000 | 1/2005 | |
| WO | WO2005082382 | 9/2005 | A61K 33/00 |
| WO | WO2007059621 | 5/2007 | B01J 23/883 |
| WO | WO2008014947 | 2/2008 | C10G 67/04 |
| WO | WO2008141830 | 11/2008 | C10G 49/04 |
| WO | WO2008141831 | 11/2008 | C10G 49/00 |
| WO | WO2008151792 | 12/2008 | C10G 1/06 |
| WO | WO2009003633 | 1/2009 | C10G 21/00 |
| WO | WO2009003634 | 1/2009 | C10G 21/00 |

OTHER PUBLICATIONS

Rana, M, A Review of Recent Advances on Process Technologies for Upgrading of Heavy Oils and Residua, Fuel 86, pp. 1216-1231.*
Gillis, et al., Upgrading Residues to Maximize Distillate Yields, 2009, UOP, p. 1-19.*
The Copper-Molybdenum Antagonism in Ruminants. III. Reaction of Copper (II) with Tetrathiomolybdate (VI), S. Laurie, D. Pratt, and J. B. Raynor, *Inorganic Chimica Acta*, vol. 123, pp. 193-196 (1986).
Polymeric ternary metal thiols I. Products from reaction of Cu(II) with $MoS_4^{2-}$, T. Ecclestone, I. Harvey, S. Laurie, M. Symons, F. Taiwo, *Inorganic Chemical Communications*, vol. 1, pp. 460-462 (1998).
Thiomolybdates—Simple but Very Versatile Reagents, S. Laurie, *Eur. J. Inorg. Chem.*, pp. 2443-2450 (2000).
Hydrodenitrogenation-Selective Catalysts, T.C. Ho, A. Jacobson, R. Chianelli, C. Lund, *Journal of Catalysis*, vol. 138, pp. 351-363 (1992).
Synthesis of tetraalkylammonium thiometallate precursors and their concurrent in situ activation during hydrodesulfurization of dibenzothiophene, G. Alonzo et al., *Applied Catalysis A: General*, vol. 263, pp. 109-117 (2004).
Synthesis of tetraalkylammonium thiometallates in aqueous solution, G. Alonzo et al., *Inorganica Chimica Acta*, vol. 325, pp. 193-197 (2001).
Synthesis and Characterization of $Et_4N)_4[MoS_4Cu_{10}Cl_{12}]$: A Polynuclear Molybdenum-Copper Cluster Containing a Central Tetrahedral $MoS_4$ Encapsulated by Octahedral $Cu_6$ and Tetrahedral $Cu_4$ Arrays, Wu et al., *Inorg. Chem.*, vol. 35, pp. 1080-1082 (1996).
Preparation and Characterization of Cu(II), Zn(II) Sulfides Obtained by Spontaneous Precipitation in Electrolyte Solutions, D. Tsamouras et al., *Langmuir*, vol. 14, pp. 5298-5304 (1998).
Physicochemical Characteristics of Mixed Copper-Cadmium Sulfides Prepared by Coprecipitation, D. Tsamouras et al., *Langmuir*, vol. 15, pp. 8018-8024 (1999).
Properties of Cu(II) and Ni(II) Sulfides Prepared by Coprecipitation in Aqueous Solution, D. Tsamouras et al., *Langmuir*, vol. 15, pp. 7940-7946 (1999).
The synthesis and characterization of $Cu_2MX_4$ (M=W or Mo; X = S, Se or S/Se) materials prepared by a solvothermal method, C. Crossland, P. Hickey, & J. Evans, *Journal of Materials Chemistry*, vol. 15, pp. 3452-3458 (2005).
Mo(W,V)-Cu(Ag)-S(Se) Cluster Compounds, H-W. Hou, X-Q Xin, S. Shi, *Coordination Chemistry Reviews*, 153, pp. 25-56 (1996).
Molecular Architecture of Copper (I) Thiometallate Complexes, Example of a Cubane with an Extra Face, $(NPr_4)_3[MS_4Cu_4Cl_5]$ (M=Mo, W), Y. Jeannin, F. Secheresse, S. Bernes, and F. Robert, *Inorganica Chimica Acta*, 198-200 pp. 493-505 (1992).

(56) References Cited

OTHER PUBLICATIONS

The Build-Up of Bimetallic Transition Metal Clusters, P. R. Raithby, *Platinum Metals Review*, 42(4) pp. 146-157 (1998).

New Aspects of Heterometallic Copper (Silver) Cluster Compounds Involving Sulfido Ligands, X. Wu, Q. Huang, Q. Wang, T. Sheng, and J. Lu, Chapter 17, *Transition Metal Sulfur Chemistry*, pp. 282-296, American Chemical Society (1996).

Properties of Biological Copper, Molybdenum, and Nickel Compounds, D. Pratt, Thesis, Leicester Polytechnic School of Chemistry (1985).

A combined in situ X-ray absorption spectroscopy and X-ray diffraction study of the thermal decomposition of ammonium tetrathiotungstate, R. Walton and S. Nibble, *J. Mater. Chem.*, vol. 9, pp. 1347-1355 (1999).

Polymers of $[MS_4]^{2-}$ (M=Mo, W) With Cu(I) and Ag(I): Synthesis and Characterization of $[Me_4N][CuMS_4]$ and $[Me_4N][AgMS_4]$ and Their Polymeric Chain Breaking Reactions with M'CN (M'=Cu, Ag) to Form Cluster Complexes, A. B. M. Shamshur Rahman et al., *Journal of Bangladesh Academy of Sciences*, vol. 30, No. 2, pp. 203-212 (2006).

Synthesis and Characterization of Copper (I) Tetrathiomolybdates, V. Lakshmanan et al., *Indian Journal of Chemistry*, vol. 33A, pp. 772-774 (Aug. 1994).

Raman, Resonance Raman, and Infrared Spectroscopic Study of Complexes Containing Copper(I)-Tetrathio-Molybdate(VI) and -Tungstate(VI) Anions, Robin J. H. Clark et al., *J. Chem. Soc. Dalton Trans.*, pp. 1595-1601 (1986).

Complexes of $d^8$ Metals with Tetrathiomolybdate and Tetrathiotungstate Ions, Synthesis, Spectroscopy, and Electrochemistry, K. P. Callahan and P. A. Piliero, *Inorg. Chem.*, vol. 19, pp. 2619-2626 (1980).

Metal Sulfide Complexes and Clusters, D. Richard, G. Luther III, Reviews in Mineralogy & Geochemistry, vol. 61, pp. 421-504 (2006).

Properties of Some Solid Tetrathiomolybdates, G. M. Clark and W. P. Doyle, *J. Inorg. Nucl. Chem.*, vol. 28, pp. 281-385 (1966).

On the Preparation, Properties, and Structure of Cuprous Ammonium Thiomolybdate, W.P. Binnie, M.J. Redman, and W.J. Mallio, *Inorg. Chem.*, vol. 9, No. 6, pp. 1449-1452 (Jun. 1970).

Quasirelativistic Effects in the Electronic Structure of the Thiomolybdate and Thiotungstate Complexes of Nickel, Palladium, and Platinum, B.D. El-Issa and M.M. Zeedan, *Inorg. Chem.*, vol. 30, pp. 2594-2605 (1991).

Spongy chalcogels of non-platinum metals act as effective hydrodesulfurization catalysts, Santanu Bag et al., *Nature Chemistry*, DOI:10.1039/NCHEM.208, pp. 1-8 (Published Online www.nature.com: May 17, 2009).

Research on Soluble Metal Sulfides: From Polysulfido Complexes to Functional Models for the Hydrogenases, Thomas B. Rauchfuss, *Inorg. Chem.*, vol. 43, pp. 14-26 (2004).

\* cited by examiner

PROCESS FOR TREATING A HYDROCARBON-CONTAINING FEED

CROSS REFERENCE TO RELATED APPLICATION

The present application claims the benefit of priority from U.S. Provisional Patent Application Ser. No. 61/297,067 filed Jan. 21, 2010.

FIELD OF THE INVENTION

The present invention is directed to a process for treating a hydrocarbon-containing feedstock.

BACKGROUND OF THE INVENTION

Increasingly, resources such as heavy crude oils, bitumen, tar sands, shale oils, and hydrocarbons derived from liquefying coal are being utilized as hydrocarbon sources due to decreasing availability of easily accessed light sweet crude oil reservoirs. These resources are disadvantaged relative to light sweet crude oils, containing significant amounts of heavy hydrocarbon fractions such as residue and asphaltenes, and often containing significant amounts of sulfur, nitrogen, metals, and/or naphthenic acids. The disadvantaged crudes typically require a considerable amount of upgrading, for example by cracking and by hydrotreating, in order to obtain more valuable hydrocarbon products. Upgrading by cracking, either thermal cracking, hydrocracking and/or catalytic cracking, is also effective to partially convert heavy hydrocarbon fractions such as atmospheric or vacuum residues derived from refining a crude oil or hydrocarbons derived from liquefying coal into lighter, more valuable hydrocarbons.

Numerous processes have been developed to crack and treat disadvantaged crude oils and heavy hydrocarbon fractions to recover lighter hydrocarbons and to reduce metals, sulfur, nitrogen, and acidity of the hydrocarbon-containing material. For example, a hydrocarbon-containing feedstock may be cracked and hydrotreated by passing the hydrocarbon-containing feedstock over a catalyst located in a fixed bed catalyst reactor in the presence of hydrogen at a temperature effective to crack heavy hydrocarbons in the feedstock and/or to reduce the sulfur content, nitrogen content, metals content, and/or the acidity of the feedstock. Another commonly used method to crack and/or hydrotreat a hydrocarbon-containing feedstock is to disperse a catalyst in the feedstock and pass the feedstock and catalyst together with hydrogen through a slurry-bed, or fluid-bed, reactor operated at a temperature effective to crack heavy hydrocarbons in the feedstock and/or to reduce the sulfur content, nitrogen content, metals content, and/or the acidity of the feedstock. Examples of such slurry-bed or fluid-bed reactors include ebullating-bed reactors, plug-flow reactors, and bubble-column reactors.

Coke formation, however, is a particular problem in processes for cracking a hydrocarbon-containing feedstock having a relatively large amount of heavy hydrocarbons such as residue and asphaltenes. Substantial amounts of coke are formed in the current processes for cracking heavy hydrocarbon-containing feedstocks, limiting the yield of lighter molecular weight hydrocarbons that can be recovered and decreasing the efficiency of the cracking process by limiting the extent of hydrocarbon conversion that can be effected per cracking step in the process, for example, by deactivating the catalysts used in the process.

Cracking heavy hydrocarbons involves breaking bonds of the hydrocarbons, particularly carbon-carbon bonds, thereby forming two hydrocarbon radicals for each carbon-carbon bond that is cracked in a hydrocarbon molecule. Numerous reaction paths are available to the cracked hydrocarbon radicals, the most important being: 1) reaction with a hydrogen donor to form a stable hydrocarbon molecule that is smaller in terms of molecular weight than the original hydrocarbon from which it was derived; and 2) reaction with another hydrocarbon or another hydrocarbon radical to form a hydrocarbon molecule larger in terms of molecular weight than the cracked hydrocarbon radical—a process called annealation. The first reaction is desired, it produces hydrocarbons of lower molecular weight than the heavy hydrocarbons contained in the feedstock—and preferably produces naphtha, distillate, or gas oil hydrocarbons. The second reaction is undesired and leads to the production of coke as the reactive hydrocarbon radical combines with another hydrocarbon or hydrocarbon radical. Furthermore, the second reaction is autocatalytic since the cracked hydrocarbon radicals are reactive with the growing coke particles. Hydrocarbon-containing feedstocks having a relatively high concentration of heavy hydrocarbon molecules therein are particularly susceptible to coking due to the presence of a large quantity of high molecular weight hydrocarbons in the feedstock with which cracked hydrocarbon radicals may combine to form proto-coke or coke. As a result, cracking processes of heavy hydrocarbon-containing feedstocks have been limited by coke formation induced by the cracking reaction itself.

Processes that utilize fixed bed catalysts to crack a heavy hydrocarbon-containing material suffer significantly from catalyst aging due to coke deposition on the catalyst over time. As noted above, coke and proto-coke formation occurs in cracking a hydrocarbon-containing material, and is particularly problematic when the hydrocarbon-containing material is a heavy hydrocarbon-containing material, for example, containing at least 20 wt. % pitch, residue, or asphaltenes. The coke that is formed in the cracking process deposits on the catalyst progressively over time, plugging the catalyst pores and covering the surface of the catalyst. The coked catalyst loses its catalytic activity and, ultimately, must be replaced. Furthermore, the cracking process must be conducted at relatively low cracking temperatures to prevent rapid deactivation of the catalyst by annealation leading to coke deposition.

Slurry catalyst processes have been utilized to address the problem of catalyst aging by coke deposition in the course of cracking a hydrocarbon-containing feedstock. Slurry catalyst particles are selected to be dispersible in the hydrocarbon-containing feedstock or in vaporized hydrocarbon-containing feedstock so the slurry catalysts circulate with the hydrocarbon-containing feedstock in the course of cracking the feedstock. The feedstock and the catalyst move together through the cracking reactor and are separated upon exiting the cracking reactor. Coke formed during the cracking reaction is separated from the feedstock, and any coke deposited on the catalyst may be removed from the catalyst by regenerating the catalyst. The regenerated catalyst may then be recirculated with fresh hydrocarbon-containing feedstock through the cracking reactor. The process, therefore, is not affected by catalyst aging since fresh catalyst may be continually added into the cracking reactor, and catalyst upon which coke has been deposited may be continually regenerated.

Other slurry catalysts have been used in slurry cracking processes for the purpose of seeding the formation of coke. Very small particle slurry catalysts may be dispersed in a hydrocarbon-containing feedstock for the purpose of providing a plethora of small sites upon which coke may deposit in the course of the cracking process. This inhibits the formation of large coke particles since the coke may be dispersed throughout the hydrocarbon-containing feedstock on the small catalyst particles.

While slurry catalyst processes provide an improvement over fixed-bed catalysis of heavy hydrocarbon feedstocks, coking remains a problem. Generally, the upper limit of recovery of hydrocarbons from a heavy hydrocarbon cracking process is around 70%, where much of the non-recoverable hydrocarbons are converted into coke.

WO 2008/141830 and WO 2008/141831 provide a process and system for hydroconversion of heavy oils utilizing a solid accumulation reactor. A hydrogenation catalyst is dispersed in a slurry in a reactor capable of operating stably in the presence of solids deriving from and generated by a heavy oil. Heavy oil is hydroconverted to produce a lighter hydrocarbon product by reaction of the heavy oil with hydrogen and the catalyst at temperatures effective to convert the heavy oil. Product may be vaporized in the reactor and stripped from the slurry to be captured as a vapor exiting the reactor, or a liquid product may be separated from the reactor, where a vapor product may be separated from the liquid product separated from the reactor. Solids including coke and metals produced by the hydroconversion accumulate in the reactor and are removed from the reactor by continuous flushing in proportion to the amount of solids generated once a pre-established minimum accumulation level is reached in the reactor. Large amounts of solids including coke, sulfided metals, and insoluble asphaltenes are generated in the process of producing the vapor product. As a result, the rate at which the heavy oil may be hydroconverted is quite slow, ranging from 50 to 300 kg/h m$^3$ of reaction volume.

The slow rate and the large quantities of solids produced by the process disclosed in WO 2008/141830 and WO 2008/141831 limits the commercial usefulness of the process. Large scale commercial facilities for upgrading heavy crude oils must be capable of upgrading large quantities of oil rapidly—typically on the order of 100,000 barrels per day. Therefore, due to the slow rate of the process disclosed in WO 2008/141830 and WO 2008/141831, a very large reactor having a large volume capacity would be required to upgrade a heavy oil on a commercially efficient scale. Such reactors are extremely capital intensive, prohibiting or limiting the application of the process due to the expense of building a commercially effective reactor.

Improved processes for cracking heavy hydrocarbon-containing feedstocks to produce a lighter hydrocarbon-containing crude product are desirable, particularly in which coke formation is significantly reduced or eliminated and the rate of hydroconversion is greatly increased.

SUMMARY OF THE INVENTION

In one aspect, the present invention is directed to a process for cracking a hydrocarbon-containing feedstock, comprising:
providing a hydrocarbon-containing feedstock to a mixing zone, where the hydrocarbon-containing feedstock is selected to contain at least 20 wt. % hydrocarbons having a boiling point of greater than 538° C. as determined in accordance with ASTM Method D5307;
providing at least one catalyst to the mixing zone;
continuously or intermittently providing hydrogen to the mixing zone;
continuously or intermittently providing hydrogen sulfide to the mixing zone, where the hydrogen sulfide is provided to the mixing zone at a mole ratio of hydrogen sulfide to hydrogen of at least 0.5:9.5 up to 1:1;
blending the hydrogen, hydrogen sulfide, hydrocarbon-containing feedstock, and the catalyst(s) in the mixing zone at a temperature of from 375° C. to 500° C. and at a total pressure of from 6.9 MPa to 27.5 MPa—where hydrogen and hydrogen sulfide are provided for mixing such that the combined hydrogen and hydrogen sulfide partial pressures provide at least 60% of the total pressur—to produce:
a) a vapor comprised of hydrocarbons that are vaporizable at the temperature and the pressure within the mixing zone; and
b) a hydrocarbon-depleted feed residuum comprising hydrocarbons that are liquid at the temperature and pressure within the mixing zone; continuously or intermittently separating at least a portion of the vapor from the mixing zone while retaining in the mixing zone at least a portion of the hydrocarbon-depleted feed residuum within the mixing zone.

DETAILED DESCRIPTION OF THE INVENTION

Figure 1:
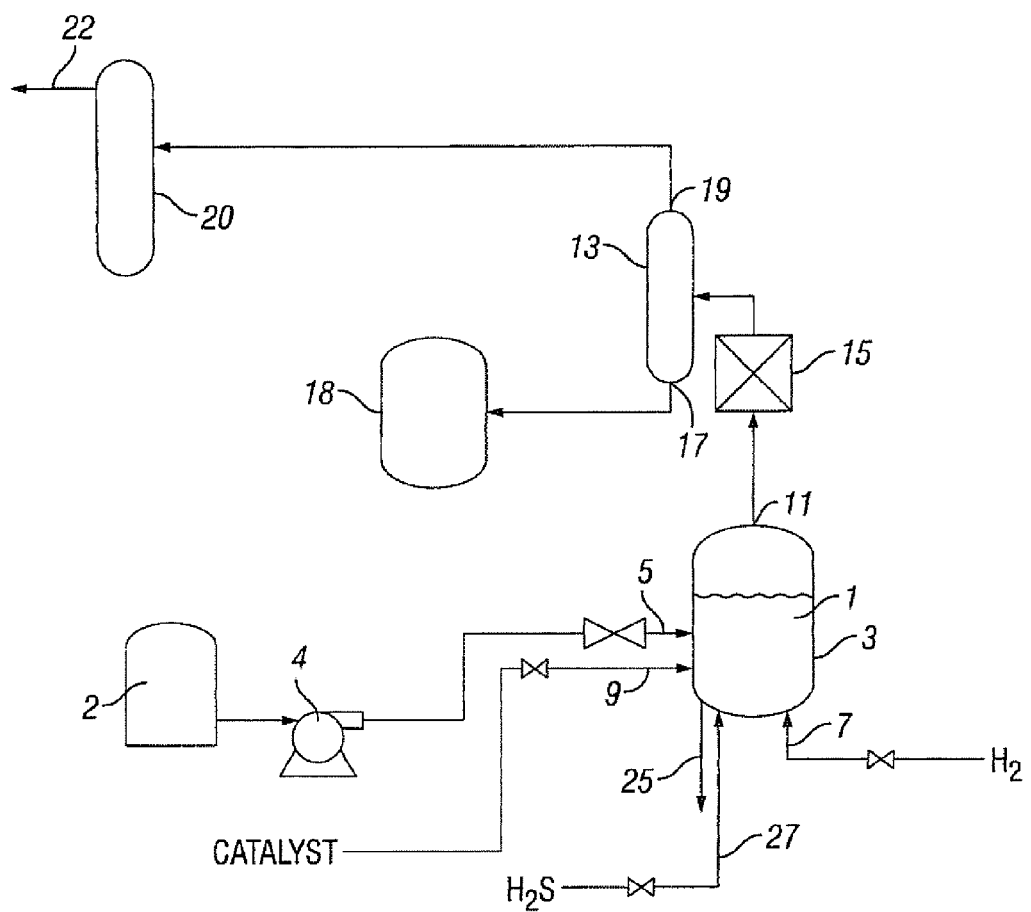
FIG. 1 is a schematic of a system useful for practicing the process of the present invention.

The present invention is directed to a process for cracking a hydrocarbon-containing feedstock containing at least 20 wt. % heavy hydrocarbons in the presence of a metal-containing catalyst, hydrogen, and hydrogen sulfide, where the hydrogen sulfide is provided in an amount effective to inhibit the formation of coke so that the process may be conducted at a relatively high temperature and at a relatively rapid rate while producing little, if any, coke.

Although the process of the invention is not to be limited thereby, it is believed that hydrogen sulfide, when present in significant quantities, acts as a catalyst in the cracking of hydrocarbons in the hydrocarbon-containing feedstock in the presence of hydrogen and a Lewis basic metal-containing catalyst and in the absence of a catalyst having significant acidity. In the presence of a Lewis basic metal-containing catalyst and in the absence of a catalyst having significant acidity, it is believed that the hydrocarbons of a hydrocarbon-containing feedstock are cracked in the process of the present invention by a Lewis base mediated reaction. Hydrogen sulfide, when present in a sufficient amount, has been found to significantly lower the activation energy of the Lewis base mediated hydrocarbon cracking reaction.

In a Lewis base mediated hydrocarbon cracking process, it is believed that a cracked hydrocarbon is reduced at the site of the hydrocarbon where the hydrocarbon is cracked, forming two hydrocarbon radical anions from the hydrocarbon. Hydrocarbon radical anions are most stable when present on a primary carbon atom, therefore, formation of primary hydrocarbon radical anions may be energetically favored when a hydrocarbon is cracked, or the cracked hydrocarbon may rearrange to form the more energetically favored primary radical anion. Should the primary radical anion react with another hydrocarbon to form a larger hydrocarbon, the reaction will result in the formation of a secondary carbon-carbon bond that is susceptible to being cracked again. However, since hydrocarbon radical anions are relatively stable they are likely to be hydrogenated by hydrogen present in the reaction mixture rather than react with another hydrocarbon in an annealtion reaction, and significant hydrocarbon radical anion-hydrocarbon reactions are unlikely. As a result, in the process of the present invention little coke is formed by agglomeration of cracked hydrocarbons.

Hydrogen sulfide, when present in a sufficient amount, is also believed to inhibit the formation of coke by agglomeration of cracked hydrocarbons. Hydrogen sulfide and hydrogen each may act as a hydrogen atom donor to hydrogenate a cracked hydrocarbon radical anion to produce a stable hydrocarbon having a smaller molecular weight than the hydrocarbon from which the hydrocarbon radical was derived. Hydrogen, however, may only act to donate a hydrogen atom to a cracked hydrocarbon radical at or near a metal-containing catalyst surface. Hydrogen sulfide, however, may act to provide a hydrogen atom to a cracked hydrocarbon radical significantly further from the metal-containing catalyst surface, and, after donation of a hydrogen atom, may accept a hydrogen atom from hydrogen near the surface of the catalyst. The hydrogen sulfide, therefore, may act as a hydrogen atom shuttle to provide atomic hydrogen to a cracked hydrocarbon radical at a distance from the catalyst. Hydrogen sulfide also reacts much more rapidly to hydrogenate a cracked hydrocarbon radical than hydrogen since the reaction of hydrogen sulfide with a cracked hydrocarbon radical to hydrogenate the radical is substantially more energetically favored than hydrogenation of the cracked hydrocarbon radical by hydrogen. Hydrogen sulfide inhibits annealation of cracked hydrocarbon radicals by rapidly reacting with the cracked hydrocarbon radicals before the cracked hydrocarbon radicals react with another hydrocarbon.

Furthermore, the thiol group remaining after hydrogen sulfide has provided a hydrogen atom to a cracked hydrocarbon radical may be provided to another hydrocarbon radical, thereby forming a meta-stable thiol-containing hydrocarbon. This may be described chemically as follows:

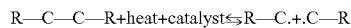　　　　1.

(catalyst=basic metal-containing catalyst)

　　　　2.

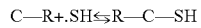　　　　3.

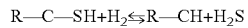　　　　4.

The thiol of the meta-stable thiol-containing hydrocarbon may be replaced by a hydrogen atom from either another hydrogen sulfide molecule or hydrogen, or may react intramolecularly to form a thiophene compound as a hydrocarbon-containing product.

It is believed, therefore, that hydrogen sulfide may increase the rate of the reaction 1) by lowering the activation energy of the hydrocarbon-cracking reaction and 2) by facilitating the removal of cracked equilibrium products (the hydrocarbon radicals) from the equilibrium (by increasing the rate of hydrogenation of the cracked hydrocarbon radicals) driving the equilibrium forward in accordance with Le Chatelier's principle. The hydrogen sulfide may also direct the selectivity of the process away from producing coke by providing atomic hydrogen at an increased rate to the cracked hydrocarbon radicals and by providing a thiol to the cracked hydrocarbon radicals—thereby inhibiting the cracked hydrocarbon radicals from agglomerating with other hydrocarbons.

The rate of a Lewis base mediated hydrocarbon cracking process, therefore, may be greatly increased with the use of significant quantities of hydrogen sulfide in the process. For example, the rate of the process may be increased by at least 1.5 times, or by at least 2 times, the rate of the process in the absence of significant quantities of hydrogen sulfide. As a result, the overall rate of the process of the present invention may be very high relative to other processes for cracking heavy hydrocarbon-containing feedstocks. The rate of the process may be at least 400, or at least 500, or at least 600, or at least 700, or at least 800, or at least 1000 kilograms(kg)/hour(h) per cubic meter ($m^3$) of reaction volume up to 5000 kg/hr per $m^3$ of reaction volume.

Although not intending the present invention to be limited thereby, with respect to the metal-containing catalyst that may be utilized in the process, it is believed that the metal-containing catalyst is highly effective for use in cracking a heavy hydrocarbon-containing material at a high rate due, at least in part, 1) to the ability of the metal-containing catalyst to donate or share electrons with hydrocarbons (i.e. to assist in reducing the hydrocarbon when the hydrocarbon is cracked so the hydrocarbon forms a hydrocarbon radical anion rather than a hydrocarbon radical cation); and 2) the surface area of the metal-containing catalyst available to interact with hydrocarbons and/or hydrocarbon radicals in the absence of any porous alumina, alumina-silica, or silica based carrier or support. The metal-containing catalyst that may be utilized in the process of the present invention have little or no acidity, and preferably are Lewis bases. As noted above, it is believed that the hydrocarbons of a hydrocarbon-containing feedstock are cracked in the process of the present invention by a Lewis base mediated reaction, wherein the metal-containing catalyst facilitates a reduction at the site of the hydrocarbon where the hydrocarbon is cracked, forming two hydrocarbon radical anions from the initial hydrocarbon.

Conventional hydrocracking catalysts utilize an active hydrogenation metal, for example a Group VIII metal such as nickel, on a support having Lewis acid properties, for example, silica, silica-alumina, or alumina supports. The acidic support catalyzes cracking hydrocarbons and the active hydrogenation metal catalyzes hydrogenation of the cracked hydrocarbon radicals. It is believed that cracking heavy hydrocarbons in the presence of a Lewis acid catalyst results in the formation of cracked hydrocarbon radical cations rather than hydrocarbon radical anions. Hydrocarbon radical cations are most stable when present on a tertiary carbon atom, therefore, cracking may be energetically directed to the formation of tertiary hydrocarbon radical cations, or, most likely, the cracked hydrocarbon may rearrange to form the more energetically favored tertiary radical cation. Hydrocarbon radical cations are unstable relative to hydrocarbon radical anions, and may react rapidly with other hydrocarbons. Should the tertiary radical cation react with another hydrocarbon to form a larger hydrocarbon, the reaction may result in the formation of a carbon-carbon bond that is not susceptible to being cracked again. As a result, coke is formed by agglomeration of the cracked hydrocarbons. Furthermore, addition of substantial quantities of hydrogen sulfide in combination with a conventional acid-based hydrocracking catalyst in a hydrocracking process has been found not to significantly reduce the formation of coke in the process or increase the rate of the process.

Certain terms that are used herein are defined as follows:
"Acridinic compound" refers to a hydrocarbon compound including the structure:

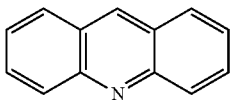 [SMILES: c1ccc2nc3ccccc3cc2c1]

As used in the present application, an acridinic compound includes any hydrocarbon compound containing the above structure, including, naphthenic acridines, napththenic benzoacridines, and benzoacridines, in addition to acridine.

"Anaerobic conditions" means "conditions in which less than 0.5 vol. % oxygen as a gas is present". For example, a process that occurs under anaerobic conditions, as used herein, is a process that occurs in the presence of less than 0.5 vol. % oxygen in a gaseous form. Anaerobic conditions may be such that no detectable oxygen gas is present.

"Aqueous" as used herein is defined as containing more than 50 vol. % water. For example, an aqueous solution or aqueous mixture, as used herein, contains more than 50 vol. % water.

"ASTM" refers to American Standard Testing and Materials.

"Atomic hydrogen percentage" and "atomic carbon percentage" of a hydrocarbon-containing material—including crude oils, crude products such as syncrudes, bitumen, tar sands hydrocarbons, shale oil, crude oil atmospheric residues, crude oil vacuum residues, naphtha, kerosene, diesel, VGO, and hydrocarbons derived from liquefying coal—are as determined by ASTM Method D5291.

"API Gravity" refers to API Gravity at 15.5° C., and as determined by ASTM Method D6822.

"Benzothiophenic compound" refers to a hydrocarbon compound including the structure:

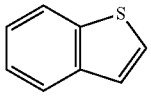

As used in the present application, a benzothiophenic compound includes any hydrocarbon compound containing the above structure, including di-benzothiophenes, naphthenic-benzothiophenes, napththenic-di-benzothiophenes, benzo-naphtho-thiophenes, naphthenic-benzo-naphthothiophenes, and dinaphtho-thiophenes, in addition to benzothiophene.

"BET surface area" refers to a surface area of a material as determined by ASTM Method D3663.

"Blending" as used herein is defined to mean contact of two or more substances by intimately admixing the two or more substances.

Boiling range distributions for a hydrocarbon-containing material may be as determined by ASTM Method D5307.

"Bond" as used herein with reference to atoms in a molecule may refer to a covalent bond, a dative bond, or an ionic bond, dependent on the context.

"Carbazolic compound" refers to a hydrocarbon compound including the structure:

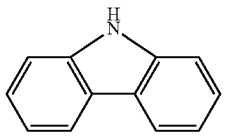 [SMILES: c1ccc2c(c1)[nH]c1ccccc12]

As used in the present application, a carbazolic compound includes any hydrocarbon compound containing the above structure, including naphthenic carbazoles, benzocarbazoles, and napthenic benzocarbazoles, in addition to carbazole.

"Carbon number" refers to the total number of carbon atoms in a molecule.

"Catalyst" refers to a substance that increases the rate of a chemical process and/or that modifies the selectivity of a chemical process as between potential products of the chemical process, where the substance is not consumed by the process. A catalyst, as used herein, may increase the rate of a chemical process by reducing the activation energy required to effect the chemical process. Alternatively, a catalyst, as used herein, may increase the rate of a chemical process by modifying the selectivity of the process between potential products of the chemical process, which may increase the rate of the chemical process by affecting the equilibrium balance of the process. Further, a catalyst, as used herein, may not increase the rate of reactivity of a chemical process but merely may modify the selectivity of the process as between potential products.

"Catalyst acidity by ammonia chemisorption" refers to the acidity of a catalyst substrate as measured by volume of ammonia adsorbed by the catalyst substrate and subsequently desorbed from the catalyst substrate as determined by ammonia temperature programmed desorption between a temperature of 120° C. and 550° C. For clarity, a catalyst that is decomposed in the measurement of acidity by ammonia temperature programmed desorption to a temperature of 550° C. and/or a catalyst for which a measurement of acidity may not be determined by ammonia temperature programmed desorption, e.g. a liquid or gas, is defined for purposes of the present invention to have an indefinite acidity as measured by ammonia chemisorption. Ammonia temperature programmed desorption measurement of the acidity of a catalyst is effected by placing a catalyst sample that has not been exposed to oxygen or moisture in a sample container such as a quartz cell; transferring the sample container containing the sample to a temperature programmed desorption analyzer such as a Micrometrics TPD/TPR 2900 analyzer; in the analyzer, raising the temperature of the sample in helium to 550° C. at a rate of 10° C. per minute; cooling the sample in helium to 120° C.; alternately flushing the sample with ammonia for 10 minutes and with helium for 25 minutes a total of 3 times, and subsequently measuring the amount of ammonia desorbed from the sample in the temperature range from 120° C. to 550° C. while raising the temperature at a rate of 10° C. per minute.

"Coke" is a solid carbonaceous material that is formed primarily of a hydrocarbonaceous material and that is insoluble in toluene as determined by ASTM Method D4072.

"Cracking" as used herein with reference to a hydrocarbon-containing material refers to breaking hydrocarbon molecules in the hydrocarbon-containing material into hydrocarbon fragments, where the hydrocarbon fragments have a lower molecular weight than the hydrocarbon molecule from which they are derived. Cracking conducted in the presence of a hydrogen donor may be referred to as hydrocracking. Cracking effected by temperature in the absence of a catalyst may be referred to a thermal cracking. Cracking may also produce some of the effects of hydrotreating such as sulfur reduction, metal reduction, nitrogen reduction, and reduction of TAN.

"Diesel" refers to hydrocarbons with a boiling range distribution from 260° C. up to 343° C. (500° F. up to 650° F.) as determined in accordance with ASTM Method D5307. Diesel content may be determined by the quantity of hydrocarbons having a boiling range of from 260° C. to 343° C. relative to a total quantity of hydrocarbons as measured by boiling range distribution in accordance with ASTM Method D5307.

"Dispersible" as used herein with respect to mixing a solid, such as a salt, in a liquid is defined to mean that the components that form the solid, upon being mixed with the liquid, are retained in the liquid at STP for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

"Distillate" or "middle distillate" refers to hydrocarbons with a boiling range distribution from 204° C. up to 343° C. (400° F. up to 650° F.) as determined by ASTM Method D5307. Distillate may include diesel and kerosene.

"Hydrogen" as used herein refers to molecular hydrogen unless specified as atomic hydrogen.

"Insoluble" as used herein refers to a substance a majority (at least 50 wt. %) of which does not dissolve or disperse in a liquid after a period of 24 hours upon being mixed with the liquid at a specified temperature and pressure, where the undissolved portion of the substance can be recovered from the liquid by physical means. For example, a fine particulate material dispersed in a liquid is insoluble in the liquid if 50 wt. % or more of the material may be recovered from the liquid by centrifugation and filtration.

"IP" refers to the Institute of Petroleum, now the Energy Institute of London, United Kingdom.

"Iso-paraffins" refer to branched chain saturated hydrocarbons.

"Kerosene" refers to hydrocarbons with a boiling range distribution from 204° C. up to 260° C. (400° F. up to 500° F.) at a pressure of 0.101 MPa. Kerosene content may be determined by the quantity of hydrocarbons having a boiling range of from 204° C. to 260° C. at a pressure of 0.101 MPa relative to a total quantity of hydrocarbons as measured by boiling range distribution in accordance with ASTM Method D5307.

"Lewis base" refers to a compound and/or material with the ability to donate one or more electrons to another compound.

"Ligand" as used herein is defined as a molecule, compound, atom, or ion attached to, or capable of attaching to, a metal ion in a coordination complex.

"Light hydrocarbons" refers to hydrocarbons having a carbon number in a range from 1 to 6.

"Mixing" as used herein is defined as contacting two or more substances by intermingling the two or more substances. Blending, as used herein, is a subclass of mixing, where blending requires intimately admixing or intimately intermingling the two or more substances, for example into a homogenous dispersion.

"Monomer" as used herein is defined as a molecular compound or portion of a molecular compound that may be reactively joined with itself or another monomer in repeated linked units to form a polymer.

"Naphtha" refers to hydrocarbon components with a boiling range distribution from 38° C. up to 204° C. (100° F. up to 400° F.) at a pressure of 0.101 MPa. Naphtha content may be determined by the quantity of hydrocarbons having a boiling range of from 38° C. to 204° C. relative to a total quantity of hydrocarbons as measured by boiling range distribution in accordance with ASTM Method D5307. Content of hydrocarbon components, for example, paraffins, iso-paraffins, olefins, naphthenes and aromatics in naphtha are as determined by ASTM Method D6730.

"Non-condensable gas" refers to components and/or a mixture of components that are gases at STP.

"n-Paraffins" refer to normal (straight chain) saturated hydrocarbons.

"Olefins" refer to hydrocarbon compounds with non-aromatic carbon-carbon double bonds. Types of olefins include, but are not limited to, cis, trans, internal, terminal, branched, and linear.

When two or more elements are described as "operatively connected", the elements are defined to be directly or indirectly connected to allow direct or indirect fluid flow between the elements.

"Periodic Table" refers to the Periodic Table as specified by the International Union of Pure and Applied Chemistry (IUPAC), November 2003. As used herein, an element of the Periodic Table of Elements may be referred to by its symbol in the Periodic Table. For example, Cu may be used to refer to copper, Ag may be used to refer to silver, W may be used to refer to tungsten etc.

"Polyaromatic compounds" refer to compounds that include three or more aromatic rings. Examples of polyaromatic compounds include, but are not limited anthracene and phenanthrene.

"Polymer" as used herein is defined as a compound comprised of repetitively linked monomers.

"Pore size distribution" refers a distribution of pore size diameters of a material as measured by ASTM Method D4641.

"SCFB" refers to standard cubic feet of gas per barrel of crude feed.

"STP" as used herein refers to Standard Temperature and Pressure, which is 25° C. and 0.101 MPa.

The term "soluble" as used herein refers to a substance a majority (at least 50 wt. %) of which dissolves in a liquid upon being mixed with the liquid at a specified temperature and pressure. For example, a material dispersed in a liquid is soluble in the liquid if less than 50 wt. % of the material may be recovered from the liquid by centrifugation and filtration.

"TAN" refers to a total acid number expressed as milligrams ("mg") of KOH per gram ("g") of sample. TAN is as determined by ASTM Method D664.

"VGO" refers to hydrocarbons with a boiling range distribution of from 343° C. up to 538° C. (650° F. up to 1000° F.) at 0.101 MPa. VGO content may be determined by the quantity of hydrocarbons having a boiling range of from 343° C. to 538° C. at a pressure of 0.101 MPa relative to a total quantity of hydrocarbons as measured by boiling range distribution in accordance with ASTM Method D5307.

"wppm" as used herein refers to parts per million, by weight.

The present invention is directed to a process for cracking a hydrocarbon-containing feedstock. A hydrocarbon-containing feedstock containing at least 20 wt. % of hydrocarbons having a boiling point of at least 538° C. is selected and is provided continuously or intermittently to a mixing zone at a selected rate. At least one metal-containing catalyst is also provided to the mixing zone. Hydrogen and hydrogen sulfide are continuously or intermittently provided to the mixing zone, where the hydrogen sulfide is provided at a mole ratio of hydrogen sulfide to hydrogen of from 0.5:9.5, where the combined hydrogen and hydrogen sulfide partial pressures provide at least 60% of the total pressure. The hydrogen and hydrogen sulfide are blended with the hydrocarbon-containing feedstock and the catalyst(s) in the mixing zone at temperature of from 375° C. to 500° C. and at a pressure of from 6.9 MPa to 27.5 MPa A (1000 psig to 4000 psig) to produce a vapor comprised of hydrocarbons that are vaporizable at the temperature and pressure within the mixing zone and a hydrocarbon-depleted feed residuum comprising hydrocarbons that are liquid at the temperature and pressure within the mixing zone. At least a portion of the vapor is separated from the mixing zone while retaining the hydrocarbon-depleted feed residuum in the mixing zone. Apart from the mixing zone, at least a portion of the vapor separated from the mixing zone may be condensed to produce a liquid hydrocarbon-containing product. Alternatively, the vapor may be hydrotreated to reduce sulfur and nitrogen content in the hydrocarbons contained in the vapor.

Hydrocarbon-Containing Feedstock

The hydrocarbon-containing feedstock contains heavy hydrocarbons that are subject to being cracked in the process. The hydrocarbon-containing feedstock, therefore, is selected to contain at least 20 wt. % hydrocarbons having a boiling point of greater than 538° C. as determined in accordance with ASTM D5307. The hydrocarbon-containing feedstock may be selected to contain at least 25 wt. %, or at least 30 wt. %, or at least 35 wt. %, or at least 40 wt. %, or at least 45 wt. %, or at least 50 wt. % hydrocarbons having a boiling point of greater than 538° C. as determined in accordance with ASTM Method D5307. The hydrocarbon-containing feedstock may be selected to contain at least 20 wt. % residue, or at least 25 wt. % residue, or at least 30 wt. % residue, or at least 35 wt. % residue, or at least 40 wt. % residue, or at least 45 wt. % residue, or least 50 wt. % residue.

The hydrocarbon-containing feedstock may contain significant quantities of lighter hydrocarbons as well as the heavy hydrocarbons. The hydrocarbon-containing feedstock may contain at least 30 wt. %, or at least 35 wt. %, or at least 40 wt. %, or at least 45 wt. %, or at least 50 wt. % of hydrocarbons having a boiling point of 538° C. or less determined in accordance with ASTM Method D5307. The hydrocarbon-containing feedstock may contain at least 20 wt. %, or at least 25 wt. %, or at least 30 wt. %, or at least 35 wt. %, or at least 40 wt. %, or at least 45 wt. % of naphtha and distillate hydrocarbons. The hydrocarbon-containing feedstock may be a crude oil, or may be a topped crude oil.

The hydrocarbon-containing feedstock may also contain quantities of metals such as vanadium and nickel. The hydrocarbon-containing feedstock may contain at least 50 wppm vanadium and at least 20 wppm nickel.

The hydrocarbon-containing feedstock may also contain quantities of sulfur and nitrogen. The hydrocarbon containing feedstock may contain at least 2 wt. % sulfur, or at least 3 wt. % sulfur; and the hydrocarbon-containing feedstock may contain at least 0.25 wt. % nitrogen, or at least 0.4 wt. % nitrogen.

The hydrocarbon-containing feedstock may also contain appreciable quantities of naphthenic acids. For example, the hydrocarbon-containing feedstock may have a TAN of at least 0.5, or at least 1.0, or at least 2.0.

The process of the present invention is particularly applicable to certain heavy petroleum and coal derived hydrocarbon-containing feedstocks. The hydrocarbon-containing feedstock may be a heavy or an extra-heavy crude oil containing significant quantities of residue or pitch; a topped heavy or topped extra-heavy crude oil containing significant quantities of residue or pitch; bitumen; hydrocarbons derived from tar sands; shale oil; crude oil atmospheric residues; crude oil vacuum residues; asphalts; and hydrocarbons derived from liquefying coal.

Hydrogen

The hydrogen that is mixed with the hydrocarbon-containing feedstock and the catalyst in the process of the present invention is derived from a hydrogen source. The hydrogen source may be hydrogen gas obtained from any conventional sources or methods for producing hydrogen gas. Optionally, the hydrogen may provided in a synthesis gas.

Hydrogen Sulfide

The hydrogen sulfide that is mixed with the hydrocarbon-containing feedstock, the hydrogen, and the catalyst in the process of the present invention may be obtained from any conventional source or method for producing hydrogen sulfide. The hydrogen sulfide provided to be mixed with the hydrocarbon-containing feedstock, hydrogen, and catalyst may be a gas or a liquid.

Catalyst

One or more metal-containing catalysts may be utilized in the process of the present invention. The one or more metal-containing catalysts are selected to catalyze hydrocracking of the hydrocarbon-containing feedstock. Each catalyst utilized in the process of the present invention preferably has little or no acidity to avoid catalyzing the formation of hydrocarbon radical cations and thereby avoid catalyzing the formation of coke. Each catalyst utilized in the process of the invention preferably has an acidity as measured by ammonia chemisorption of at most 200, or at most 100, or at most 50, or at most 25, or at most 10 µmol ammonia per gram of catalyst, and most preferably has an acidity as measured by ammonia chemisorption of 0 µmol ammonia per gram of catalyst. In an embodiment, the one or more catalysts comprise at most 0.1 wt. %, or at most 0.01 wt. %, or at most 0.001 wt. % of alumina, alumina-silica, or silica, and, preferably, the one or more catalysts contain no detectable alumina, alumina-silica, or silica.

The one or more metal-containing catalysts used in the process of the present invention may contain little or no oxygen. The catalytic activity of the metal-containing catalyst(s) in the process of the present invention is, in part, believed to be due to the availability of electrons from the catalyst(s) to stabilize cracked molecules in the crude oil. Due to its electronegativity, oxygen tends to reduce the availability of electrons from a catalyst when it is present in the catalyst in appreciable quantities, therefore, each catalyst utilized in the process preferably contains little or no oxygen. Each catalyst utilized in the process may comprise at most 0.1 wt. %, or at most 0.05 wt. %, or at most 0.01 wt. % oxygen as measured by neutron activation. In a preferred embodiment, oxygen is not detectable in each catalyst utilized in the process.

One or more of the metal-containing catalysts may be a solid particulate substance having a particle size distribution with a relatively small mean and/or median particle size, where the solid catalyst particles preferably are nanometer size particles. A catalyst may have a particle size distribution with a median particle size and/or mean particle size of at least 50 nm, or at least 75 nm, or up to 5 µm, or up to 1 µm; or up to 750 nm, or from 50 nm up to 5 µm. A solid particulate catalyst having a particle size distribution with a large quantity of small particles, for example having a mean and/or median particle size of up to 5 µm, has a large aggregate surface area since little of the catalytically active components of the catalyst are located within the interior of a particle. A particulate catalyst having a particle size distribution with a large quantity of small particles, therefore, may be desirable for use in the process of the present invention to provide a relatively high degree catalytic activity due to the surface area of the catalyst available for catalytic activity. A catalyst used in the process of the invention may be a solid particulate substance preferably having a particle size distribution with a mean particle size and/or median particle size of up to 1 µm, preferably having a pore size distribution with a mean pore diameter and/or a median pore diameter of from 50 to 1000 angstroms, or from 60 to 350 angstroms, preferably having a pore volume of at least 0.2 cm³/g, or at least 0.25 cm³/g or at least 0.3 cm³/g, or at least 0.35 cm³/g, or at least 0.4 cm³/g, and preferably having a BET surface area of at least 50 m²/g, or at least 100 m²/g, and up to 400 m²/g, or up to 500 m²/g.

A solid particulate catalyst utilized in the process of the present invention may be insoluble in the hydrocarbon-containing feed and in the hydrocarbon-depleted feed residuum formed by the process of the present invention. A solid particulate catalyst having a particle size distribution with a median and/or mean particle size of at least 50 nm may be insoluble in the hydrocarbon-containing feed and the hydrocarbon-depleted residuum due, in part, to the size of the particles, which may be too large to be solvated by the hydrocarbon-containing feed or the residuum Use of a solid particulate catalyst which is insoluble in the hydrocarbon-containing feed and the hydrocarbon-depleted feed residuum may be desirable in the process of the present invention so that the catalyst may be separated from the residuum formed by the process, and subsequently regenerated for reuse in the process.

A catalyst that may be used in the process of the present invention has an acidity as measured by ammonia chemisorption of at most 200 μmol ammonia per gram of catalyst, and comprises a material comprised of a metal of Column(s) 6-10 of the Periodic Table or a compound of a metal of Column(s) 6-10 of the Periodic Table. The catalyst may be a bi-metallic catalyst comprised of a metal of Column 6, 14, or 15 of the Periodic Table or a compound of a metal of Column 6, 14, or 15 of the Periodic Table and a metal of Column(s) 3 or 7-15 of the Periodic Table or a compound of a metal of Column(s) 3 or 7-15 of the Periodic Table, where the catalyst has an acidity as measured by ammonia chemisorption of at most 200 μmol ammonia per gram of catalyst.

In a preferred embodiment, a catalyst that is mixed with the hydrocarbon-containing feedstock and the hydrogen in the mixing zone is comprised of a material that is comprised of a first metal, a second metal, and sulfur. The first metal of the material of the catalyst may be a metal selected from the group consisting of copper (Cu), iron (Fe), bismuth (Bi), nickel (Ni), cobalt (Co), silver (Ag), manganese (Mn), zinc (Zn), tin (Sn), ruthenium (Ru), lanthanum (La), cerium (Ce), praseodymium (Pr), samarium (Sm), europium (Eu), ytterbium (Yb), lutetium (Lu), dysprosium (Dy), lead (Pb), and antimony (Sb). The first metal may be relatively electron-rich, inexpensive, and relatively non-toxic, and preferably the first metal is selected to be copper or iron, most preferably copper. The second metal of the material of the catalyst is a metal selected from the group consisting of molybdenum (Mo), tungsten (W), vanadium (V), tin (Sn), and antimony (Sb), where the second metal is not the same metal as the first metal.

The material of a preferred catalyst may be comprised of at least three linked chain elements, where the chain elements are comprised of a first chain element and a second chain element. The first chain element includes the first metal and sulfur and has a structure according to formula (I) and the second chain element includes the second metal and sulfur and has a structure according to formula (II):

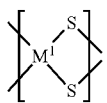

(I)

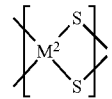

(II)

where $M^1$ is the first metal and $M^2$ is the second metal. The catalyst material containing the chain elements contains at least one first chain element and at least one second chain element. The chain elements of the material of the catalyst are linked by bonds between the two sulfur atoms of a chain element and the metal of an adjacent chain element. A chain element of the material of the catalyst may be linked to one, or two, or three, or four other chain elements, where each chain element may be linked to other chain elements by bonds between the two sulfur atoms of a chain element and the metal of an adjacent chain element. At least three linked chain elements may be sequentially linked in series. At least a portion of the material of the catalyst containing the chain elements may be comprised of the first metal and the second metal linked by, and bonded to, sulfur atoms according to formula (III):

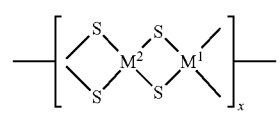

(III)

where $M^1$ is the first metal, $M^2$ is the second metal, and x is at least 2. The material of the catalyst may be a polythiometallate polymer, where each monomer of the polymer is the structure as shown in formula (III) where x=1, and the polythiometallate polymer is the structure as shown in formula (III) where x is at least 5. At least a portion of the material of the catalyst may be comprised of the first metal and second metal, where the first metal is linked to the second metal by sulfur atoms as according to formula (IV) or formula (V):

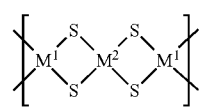

(IV)

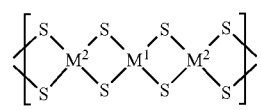

(V)

where $M^1$ is the first metal and where $M^2$ is the second metal.

The material of the catalyst described above may comprise a third chain element comprised of sulfur and a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal. The third chain element has a structure according to formula (VI):

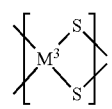

(VI)

where $M^3$ is the third metal. If the material of the catalyst contains a third chain element, at least a portion of the third chain element of the material of the catalyst is linked by bonds between the two sulfur atoms of a chain element and the metal of an adjacent chain element.

At least a portion of the catalyst material may be comprised of the first metal, the second metal, and sulfur having a structure according to formula (VII):

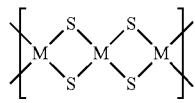

(VII)

where M is either the first metal or the second metal, and at least one M is the first metal and at least one M is the second metal. The catalyst material as shown in formula (VII) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal.

The portion of the catalyst material comprised of the first metal, the second metal, and sulfur may also have a structure according to formula (VIII):

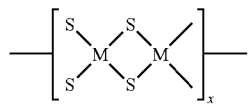

(VIII)

where M is either the first metal or the second metal, at least one M is the first metal and at least one M is the second metal, and x is at least 2. The material of the catalyst may be a polythiometallate polymer, where each monomer of the polymer is the structure as shown in formula (VIII) where x=1, and the polythiometallate polymer is the structure as shown in formula (VIII) where x is at least 5.

At least a portion of the material of the catalyst may be comprised of the first metal, the second metal, and sulfur having a structure according to formula (IX):

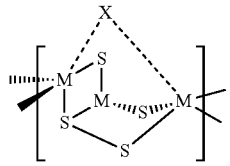

(IX)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. For example, the material of the catalyst may contain copper thiometallate-sulfate having the structure shown in formula (X):

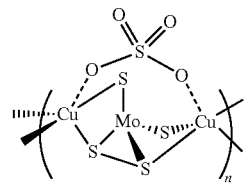

(X)

where n may be an integer greater than or equal to 1. The material of the catalyst as shown in formula (IX) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (XI):

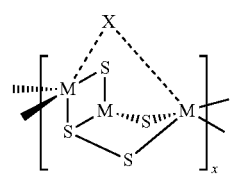

(XI)

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5;

At least a portion of the catalyst material may be comprised of the first metal, the second metal, and sulfur having a structure according to formula (XII):

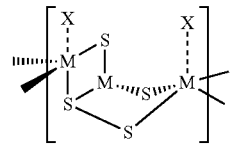

(XII)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. The material of the catalyst as shown in formula (XII) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the catalyst material com prised of the first metal, the second metal, and sulfur may also have a polymeric structure according to formula (XIII).

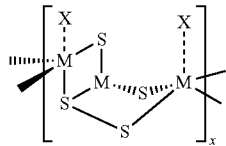
(XIII)

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5.

At least a portion of the catalyst material may be comprised of the first metal, the second metal, and sulfur having a structure according to formula (XIV):

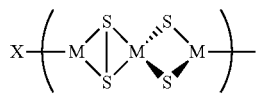
(XIV)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. For example, at least a portion of the catalyst material may have a structure in accordance with formula (XV):

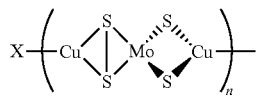
(XV)

where X is selected from the group consisting of $SO_4$, $PO_4$, oxalate ($C_2O_4$), acetylacetonate, acetate, citrate, tartrate, Cl, Br, I, $ClO_4$, and $NO_3$, and n is an integer equal to or greater than 1. The catalyst material as shown in formula (XIV) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the catalyst material comprised of the first metal, the second metal, and sulfur may also have a polymeric structure according to formula (XVI):

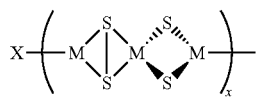
(XVI)

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5.

A preferred catalyst preferably is formed primarily of a material comprised of the first metal, second metal, and sulfur as described above, and the material of the preferred catalyst is formed primarily of the first metal, second metal, and sulfur as described above. The first metal, second metal, and sulfur may comprise at least 75 wt. %, or at least 80 wt. %, or at least 85 wt. %, or at least 90 wt. %, or at least 95 wt. %, or at least 99 wt. % or 100 wt. % of the material of the catalyst structured as described above, where the material of the catalyst comprises at least 50 wt. % or at least 60 wt. %, or at least 70 wt. %, or at least 75 wt. %, or at least 80 wt. %, or at least 90 wt. %, or at least 95 wt. %, or at least 99 wt. % or 100 wt. % of the catalyst.

The first metal may be present in the material of a preferred catalyst described above, in an atomic ratio relative to the second metal of at least 1:2. The atomic ratio of the first metal to the second metal in the material of the catalyst, and/or in the catalyst, may be greater than 1:2, or at least 2:3, or at least 1:1, or at least 2:1, or at least 3:1, or at least 5:1. It is believed that the first metal contributes significantly to the catalytic activity of the catalyst in the process of the present invention when the first metal is present in the material of the catalyst, and/or in the catalyst, in an amount relative to the second metal ranging from slightly less of the first metal to the second metal to significantly more of the first metal to the second metal. Therefore, the first metal may be incorporated in the material of the catalyst, and/or in the catalyst, in an amount, relative to the second metal, such that the atomic ratio of the first metal to the second metal ranges from one half to significantly greater than one, such that the first metal is not merely a promoter of the second metal in the catalyst.

A preferred catalyst—when primarily formed of the material of the catalyst, where the material of the catalyst is primarily formed of the first metal, the second metal, and sulfur structured as described above, and particularly when the first metal, the second metal, and the sulfur that form the material of the catalyst are not supported on a carrier or support material to form the catalyst—may have a significant degree of porosity, pore volume, and surface area. In the absence of a support or a carrier, the catalyst may have a pore size distribution, where the pore size distribution has a mean pore diameter and/or a median pore diameter of from 50 angstroms to 1000 angstroms, or from 60 angstroms to 350 angstroms. In the absence of a support or a carrier, the catalyst may have a pore volume of at least 0.2 cm$^3$/g, or at least 0.25 cm$^3$/g, or at least 0.3 cm$^3$/g, or at least 0.35 cm$^3$/g, or at least 0.4 cm$^3$/g. In the absence of a support or a carrier, the catalyst may have a BET surface area of at least 50 m$^2$/g, or at least 100 m$^2$, and up to 400 m$^2$/g or up to 500 m$^2$/g.

The relatively large surface area of the preferred catalyst, particularly relative to conventional non-supported bulk metal catalysts, is believed to be due, in part, to the porosity of the catalyst imparted by at least a portion of the material of the catalyst being formed of abutting or adjoining linked tetrahedrally structured atomic formations of the first metal and sulfur and the second metal and sulfur, where the tetrahedrally structured atomic formations may be edge-bonded. Interstices or holes that form the pore structure of the catalyst may be present in the material of the catalyst as a result of the bonding patterns of the tetrahedral structures. Preferred catalysts, therefore, may be highly catalytically active since 1) the catalysts have a relatively large surface area; and 2) the surface area of the catalysts is formed substantially, or entirely, of the elements that provide catalytic activity—the first metal, the second metal, and sulfur.

The material of a preferred catalyst may contain less than 0.5 wt. % of ligands other than sulfur-containing ligands. Ligands, other than sulfur-containing ligands, may not be present in significant quantities in the material since they may limit the particle size of the material of the catalyst to less than 50 nm, for example, by inhibiting the first metal and the second metal from forming sulfur-bridged chains.

Method of Preparing Preferred Catalysts

A preferred metal-containing catalyst utilized in the process of the present invention may be prepared by mixing a first salt and a second salt in an aqueous mixture under anaerobic conditions at a temperature of from 15° C. to 150° C., and separating a solid from the aqueous mixture to produce the catalyst material.

The first salt utilized to form a preferred catalyst includes a cationic component comprising a metal in any non-zero oxidation state selected from the group consisting of Cu, Fe, Ni, Co, Bi, Ag, Mn, Zn, Sn, Ru, La, Ce, Pr, Sm, Eu, Yb, Lu, Dy, Pb, and Sb, where the metal of the cationic component is the first metal of the material of the catalyst. The cationic component of the first salt may consist essentially of a metal selected from the group consisting of Cu, Fe, Bi, Ni, Co, Ag, Mn, Zn, Sn, Ru, La, Ce, Pr, Sm, Eu, Yb, Lu, Dy, Pb, and Sb. The cationic component of the first salt must be capable of bonding with the anionic component of the second salt to form the material of the catalyst in the aqueous mixture at a temperature of from 15° C. to 150° C. and under anaerobic conditions.

The first salt also contains an anionic component associated with the cationic component of the first salt to form the first salt. The anionic component of the first salt may be selected from a wide range of counterions to the cationic component of the first salt so long as the combined cationic component and the anionic component of the first salt form a salt that is dispersible, and preferably soluble, in the aqueous mixture in which the first salt and the second salt are mixed, and so long as the anionic component of the first salt does not prevent the combination of the cationic component of the first salt with the anionic component of the second salt in the aqueous mixture to form the material of the catalyst. The anionic component of the first salt may be selected from the group consisting of sulfate, chloride, bromide, iodide, acetate, acetylacetonate, phosphate, nitrate, perchlorate, oxalate, citrate, and tartrate.

The anionic component of the first salt may associate with or be incorporated into a polymeric structure including the cationic component of the first salt and the anionic component of the second salt to form the material of the catalyst. For example, the anionic component of the first salt may complex with a polymeric structure formed of the cationic component of the first salt and the anionic component of the second salt as shown in formulas (XI) and (XIII) above, where X=the anionic component of the first salt, or may be incorporated into a polymeric structure including the cationic component of the first salt and the anionic component of the second salt as shown in formula (XVI) above, where X=the anionic component of the first salt.

Certain compounds are preferred for use as the first salt to form a preferred catalyst. In particular, the first salt is preferably selected from the group consisting of $CuSO_4$, copper acetate, copper acetylacetonate, $FeSO_4$, $Fe_2(SO_4)_3$, iron acetate, iron acetylacetonate, $NiSO_4$, nickel acetate, nickel acetylacetonate, $CoSO_4$, cobalt acetate, cobalt acetylacetonate, $ZnCl_2$, $ZnSO_4$, zinc acetate, zinc acetylacetonate, silver acetate, silver acetylacetonate, $SnSO_4$, $SnCl_4$, tin acetate, tin acetylacetonate, $MnSO_4$, manganese acetate, manganese acetylacetonate, bismuth acetate, bismuth acetylacetonate, and hydrates thereof. These materials are generally commercially available, or may be prepared from commercially available materials according to well-known methods.

The first salt is contained in an aqueous solution or an aqueous mixture, where the aqueous solution or aqueous mixture containing the first salt (hereinafter the "first aqueous solution") is mixed with an aqueous solution or an aqueous mixture containing the second salt (hereinafter the "second aqueous solution") in the aqueous mixture to form the material of the preferred catalyst. The first salt may be dispersible, and most preferably soluble, in the first aqueous solution and is dispersible, and preferably soluble, in the aqueous mixture of the first and second salts. The first aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. The first aqueous solution may contain no organic solvent, and may consist essentially of water, preferably deionized water, and the first salt.

The concentration of the first salt in the first aqueous solution may be selected to promote formation of a preferred catalyst having a particle size distribution with a small mean and/or median particle size, where the particles have a relatively large surface area, upon mixing the first salt and the second salt in the aqueous mixture. To promote the formation of a catalyst material having a relatively large surface area and having particle size distribution with a relatively small mean and/or median particle size, the first aqueous solution may contain at most 3 moles per liter, or at most 2 moles per liter, or at most 1 mole per liter, or at most 0.6 moles per liter, or at most 0.2 moles per liter of the first salt.

The second salt utilized to form a preferred catalyst includes an anionic component that is a tetrathiometallate of molybdenum, vanadium, tungsten, tin or antimony. In particular, the second salt may contain an anionic component that is selected from the group consisting of $MoS_4^{2-}$, $WS_4^{2-}$, $VS_4^{3-}$, $SnS_4^{4-}$, and $SbS_4^{3-}$.

The second salt also contains a cationic component associated with the anionic component of the second salt to form the second salt. The cationic component of the second salt may be selected from an ammonium counterion, and alkali metal and alkaline earth metal counterions to the tetrathiometallate anionic component of the second salt so long as the combined cationic component and the anionic component of the second salt form a salt that is dispersable, and preferably soluble, in the aqueous mixture in which the first salt and the second salt are mixed, and so long as the cationic component of the second salt does not prevent the combination of the cationic component of the first salt with the anionic component of the second salt in the aqueous mixture to form the catalyst material. The cationic component of the second salt may comprise one or more sodium ions, or one or more potassium ions, or one or more ammonium ions.

Certain compounds are preferred for use as the second salt used to form a preferred catalyst. In particular, the second salt is preferably selected from the group consisting of $Na_2MoS_4$, Na$_2$WS$_4$, Na$_3$VS$_4$, K$_2$MoS$_4$, K$_2$WS$_4$, K$_3$VS$_4$, (NH$_4$)$_2$MoS$_4$, (NH$_4$)$_2$WS$_4$, (NH$_4$)$_3$VS$_4$, Na$_4$SnS$_4$, (NH$_4$)$_4$SnS$_4$, (NH$_4$)$_3$SbS$_4$, Na$_3$SbS$_4$, and hydrates thereof.

The second salt may be a commercially available tetrathiomolybdate or tetrathiotungstate salt. For example, the second salt may be ammonium tetrathiomolybdate, which is commercially available from AAA Molybdenum Products, Inc. 7233 W. 116 Pl., Broomfield, Colo., USA 80020, ammonium tetrathiotungstate, which is commercially available from Sigma-Aldrich, 3050 Spruce St., St. Louis, Mo., USA 63103, or ammonium tetrathiovanadate, which is commercially available from Chemos GmbH, Germany Alternatively, the second salt may be produced from a commercially available tetrathiomolybdate or tetrathiotungstate salt. For example, the second salt may be produced from an ammonium tetrathiomolybdate, ammonium tetrathiotungstate, or ammonium tetrathiovanadate salt. The second salt may be formed from the commercially available ammonium tetrathiometallate salts by exchanging the cationic ammonium component of the commercially available salt with a desired alkali or alkaline earth cationic component from a separate salt. The exchange of the cationic components to form the desired second salt may be effected by mixing the commercially available salt and the salt containing the desired cationic component in an aqueous solution to form the desired second salt.

A method of forming the second salt is to disperse an ammonium tetrathiomolybdate, ammonium tetrathiotungstate, or ammonium tetrathiovanadate in an aqueous solution, preferably water, and to disperse an alkali metal or alkaline earth metal cationic component donor salt, preferably a carbonate, in the aqueous solution, where the cationic component donor salt is provided in an amount relative to the ammonium tetrathiomolybdate, ammonium tetrathiotungstate, or ammonium tetrathiovanadate salt to provide a stoichiometrially equivalent or greater amount of its cation to ammonium of the ammonium tetrathiomolybdate, ammonium tetrathiotungstate, or ammonium tetrathiovanadate salt. The aqueous solution may be heated to a temperature of at least 50° C., or at least 65° C. up to 100° C. to evolve ammonia from the ammonium containing salt and carbon dioxide from the carbonate containing salt as gases, and to form the second salt. For example a Na$_2$MoS$_4$ salt may be prepared for use as the second salt by mixing commercially available (NH$_4$)$_2$MoS$_4$ and Na$_2$CO$_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

If the second salt is a sodium tetrathiostannate salt, it may be produced by dissolving Na$_2$Sn(OH)$_6$ and Na$_2$S in a 1:4 molar ratio in boiling deionized water (100 g of Na$_2$Sn(OH)$_6$ per 700 ml of water and 250 g of Na$_2$S per 700 ml of water), stiffing the mixture at 90-100° C. for 2-3 hours, adding finely pulverized MgO to the mixture at a 2:5 wt. ratio relative to the Na$_2$Sn(OH)$_6$ and continuing stiffing the mixture at 90-100° C. for an additional 2-3 hours, cooling and collecting precipitated impurities from the mixture, then concentrating the remaining solution by 50-60 vol. %, allowing the concentrated solution to stand, then collecting the Na$_4$SnS$_4$ that crystallizes from the concentrated solution. An ammonium tetrathiostannate salt may be produced by mixing SnS$_2$ with (NH$_4$)$_2$S in a 1:2 mole ratio in liquid ammonia under an inert gas (e.g. nitrogen), filtering, and recovering the solid (NH$_4$)$_4$SnS$_4$ as a residue.

The second salt is contained in an aqueous solution (the second aqueous solution, as noted above), where the second aqueous solution containing the second salt is mixed with the first aqueous solution containing the first salt in the aqueous mixture to form the preferred catalyst. The second salt is preferably dispersible, and most preferably soluble, in the second aqueous solution and is dispersible, and preferably soluble, in the aqueous mixture containing the first and second salts. The second aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. Preferably, the second aqueous solution contains no organic solvent. Most preferably the second aqueous solution consists essentially of water, preferably deionized, and the second salt.

The concentration of the second salt in the second aqueous solution may be selected to promote formation of a catalyst having a particle size distribution with a small mean and/or median particle size and having a relatively large surface area per particle upon mixing the first salt and the second salt in the aqueous mixture. To promote the formation of a catalyst material having a particle size distribution with a relatively small mean and/or median particle size, the second aqueous solution may contain at most 0.8 moles per liter, or at most 0.6 moles per liter, or at most 0.4 moles per liter, or at most 0.2 moles per liter, or at most 0.1 moles per liter of the second salt.

The first and second solutions containing the first and second salts, respectively, are mixed in an aqueous mixture to form the preferred catalyst. The amount of the first salt relative to the amount of the second salt provided to the aqueous mixture may be selected so that the atomic ratio of the cationic component metal of the first salt to the metal of the anionic component of the second salt is at least 1:2, or greater than 1:2, or at least 2:3, or at least 1:1, and at most 20:1, or at most 15:1, or at most 10:1.

The aqueous mixture of the first and second salts is formed by adding the first aqueous solution containing the first salt and the second aqueous solution containing the second salt into an aqueous solution separate from both the first aqueous solution and the second aqueous solution. The separate aqueous solution will be referred hereafter as the "third aqueous solution". The third aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the third aqueous solution, if any, should be selected so that the organic compounds in the organic solvent do not inhibit reaction of the cationic component of the first salt with the anionic component of the second salt upon forming the aqueous mixture, e.g., by forming ligands or reacting with the cationic component of the first salt or with the anionic component of the second salt. Preferably, the third aqueous solution contains no organic solvent, and most preferably comprises deionized water.

The aqueous mixture of the first and second salts is formed by combining the first aqueous solution containing the first salt and the second aqueous solution containing the second salt in the third aqueous solution. The volume ratio of the third aqueous solution to the first aqueous solution containing the first salt may be from 0.5:1 to 50:1 where the first aqueous solution may contain at most 3, or at most 2, or at most 1, or at most 0.8, or at most 0.5, or at most 0.3 moles of the first salt per liter of the first aqueous solution. Likewise, the volume ratio of the third aqueous solution to the second aqueous solution containing the second salt may be from 0.5:1 to 50:1 where the second aqueous solution may contain at most 0.8, or at most 0.4, or at most 0.2, or at most 0.1 moles of the second salt per liter of the second aqueous solution.

The first salt and the second salt may be combined in the aqueous mixture so that the aqueous mixture containing the first and second salts contains at most 1.5, or at most 1.2, or at most 1, or at most 0.8, or at most 0.6 moles of the combined first and second salts per liter of the aqueous mixture. The particle size of the catalyst material produced by mixing the first and second salts in the aqueous mixture increases, and the surface area of the particles decreases, with increasing concentrations of the salts. Therefore, to limit the particle sizes in the particle size distribution of the catalyst material and to increase the relative surface area of the particles, the aqueous mixture may contain at most 0.8 moles of the combined first and second salts per liter of the aqueous mixture, more preferably at most 0.6 moles, or at most 0.4 moles, or at most 0.2 moles of the combined first and second salts per liter of the aqueous mixture. The amount of the first salt and the total volume of the aqueous mixture may be selected to provide at most 1, or at most 0.8, or at most 0.4 moles of the cationic component of the first salt per liter of the aqueous mixture and the amount of the second salt and the total volume of the aqueous mixture may be selected to provide at most 0.4, or at most 0.2, or at most 0.1, or at most 0.01 moles of the anionic component of the second salt per liter of the aqueous mixture.

The rate of addition of the first and second aqueous solutions containing the first and second salts, respectively, to the aqueous mixture may be controlled to limit the instantaneous concentration of the first and second salts in the aqueous mixture to produce a catalyst material comprised of relatively small particles having relatively large surface area Limiting the instantaneous concentration of the salts in the aqueous mixture may reduce the mean and/or median particle size of the resulting catalyst material by limiting the simultaneous availability of large quantities of the cationic components of the first salt and large quantities of the anionic components of the second salt that may interact to form a catalyst material comprised primarily of relatively large particles. The rate of addition of the first and second solutions to the aqueous mixture may be controlled to limit the instantaneous concentration of the first salt and the second salt in the aqueous mixture to at most 0.05 moles per liter, or at most 0.01 moles per liter, or at most 0.001 moles per liter.

The first aqueous solution containing the first salt and the second aqueous solution containing the second salt may be added to the third aqueous solution, preferably simultaneously, at a controlled rate selected to provide a desired instantaneous concentration of the first salt and the second salt in the aqueous mixture. The first aqueous solution containing the first salt and the second aqueous solution containing the second salt may be added to the third aqueous solution at a controlled rate by adding the first aqueous solution and the second aqueous solution to the third aqueous solution in a dropwise manner The rate that drops of the first aqueous solution and the second aqueous solution are added to the third aqueous solution may be controlled to limit the instantaneous concentration of the first salt and the second salt in the aqueous mixture as desired. The first aqueous solution containing the first salt and the second aqueous solution containing the second salt may also be dispersed directly into the third aqueous solution at a flow rate selected to provide a desired instantaneous concentration of the first salt and the second salt. The first aqueous solution and the second aqueous solution may be dispersed directly into the third aqueous solution using conventional means for dispersing one solution into another solution at a controlled flow rate. For example, the first aqueous solution and the second aqueous solution may be dispersed into the third aqueous solution through separate nozzles located within the third aqueous solution, where the flow of the first and second solutions through the nozzles is metered by separate flow metering devices.

The particle size distribution of the catalyst material produced by mixing the first salt and the second salt in the aqueous mixture is preferably controlled by the rate of addition of the first and second aqueous solutions to the third aqueous solution, as described above, so that the median and/or mean particle size of the particle size distribution falls within a range of from 50 nm to 5 μm. The particle size distribution of the catalyst material may be controlled by the rate of addition of the first and second aqueous solutions to the third aqueous solution so that the median and/or mean particle size of the particle size distribution of the catalyst material may range from at least 50 nm up to 1 μm, or up to 750 μm, or up to 500 nm.

The surface area of the catalyst material particles produced by mixing the first and second aqueous solutions in the third aqueous solution is preferably controlled by the rate of addition of the first and second aqueous solutions to the third aqueous solution, as described above, so that the BET surface area of the catalyst material particles may range from 50 $m^2$/g to 500 $m^2$/g. The surface area of the catalyst material particles may be controlled by the rate of addition of the first and second aqueous solutions to the third aqueous solution so that the BET surface area of the catalyst material particles is from 100 $m^2$/g to 350 $m^2$/g The aqueous mixture containing the first salt and the second salt is mixed to facilitate interaction and reaction of the cationic component of the first salt with the anionic component of the second salt to form the catalyst material. The aqueous mixture may be mixed by any conventional means for agitating an aqueous solution or an aqueous dispersion, for example by mechanical stiffing.

During mixing of the aqueous mixture of the first and second salts, the temperature of the aqueous mixture is maintained in the range of from 15° C. to 150° C., or from 60° C. to 125° C., or from 65° C. to 100° C. When the cationic component of the second salt is ammonium, the temperature should be maintained in a range from 65° C. to 150° C. to evolve ammonia as a gas from the second salt. The temperature of the aqueous mixture during mixing may be maintained at less than 100° C. so that the mixing may be conducted without the application of positive pressure necessary to inhibit the water in the aqueous mixture from becoming steam. If the second salt is a tetrathiostannate, the temperature of the aqueous mixture may be maintained at 100° C. or less to inhibit the degradation of the second salt into tin disulfides.

Maintaining the temperature of the aqueous mixture in a range of from 50° C. to 150° C. may result in production of a catalyst material having a relatively large surface area and a substantially reduced median or mean particle size relative to a catalyst material produced in the same manner at a lower temperature. It is believed that maintaining the temperature in the range of 50° C. to 150° C. drives the reaction of the cationic component of the first salt with the anionic component of the second salt, reducing the reaction time and limiting the time available for the resulting product to agglomerate prior to precipitation. Maintaining the temperature in a range of from 50° C. to 150° C. during the mixing of the first and second salts in the aqueous mixture may result in production of a catalyst material having a particle size distribution with a median or mean particle size of from 50 nm up to 5 µm, or up to 1 µm, or up to 750 nm; and having a BET surface area of from 50 $m^2/g$ up to 500 $m^2/g$ or from 100 $m^2/g$ to 350 $m^2/g$.

The first and second salts in the aqueous mixture may be mixed under a pressure of from 0.101 MPa to 10 MPa (1.01 bar to 100 bar). Preferably, the first and second salts in the aqueous mixture are mixed at atmospheric pressure, however, if the mixing is effected at a temperature greater than 100° C. the mixing may be conducted under positive pressure to inhibit the formation of steam.

During mixing, the aqueous mixture of the first and second salts is maintained under anaerobic conditions. Maintaining the aqueous mixture under anaerobic conditions during mixing inhibits the oxidation of the catalyst material or the anionic component of the second salt so that the catalyst material produced by the process contains little, if any oxygen other than oxygen present in the first and second salts. The aqueous mixture of the first and second salts may be maintained under anaerobic conditions during mixing by conducting the mixing in an atmosphere containing little or no oxygen, preferably an inert atmosphere. The mixing of the first and second salts in the aqueous mixture may be conducted under nitrogen gas, argon gas, and/or steam to maintain anaerobic conditions during the mixing. An inert gas, preferably nitrogen gas or steam, may be continuously injected into the aqueous mixture during mixing to maintain anaerobic conditions and to facilitate mixing of the first and second salts in the aqueous mixture and displacement of ammonia gas if the second salt contains an ammonium cation.

The first and second salts may be mixed in the aqueous mixture at a temperature of from 15° C. to 150° C. under anaerobic conditions for a period of time sufficient to permit the formation of the preferred catalyst material. The first and second salts may be mixed in the aqueous mixture for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to form the catalyst material. The first and/or second salt(s) may be added to the aqueous mixture over a period of from 30 minutes to 4 hours while mixing the aqueous mixture, and, after the entirety of the first and second salts have been mixed into the aqueous mixture, the aqueous mixture may be mixed for at least an additional 1 hour, or 2 hours, or 3 hours or 4 hours, or 5 hours to form the catalyst material.

After completing mixing of the aqueous mixture of the first and second salts, a solid may be separated from the aqueous mixture to produce the preferred catalyst material. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and separating the solid from the mixture by vacuum or gravitational filtration or by centrifugation. To enhance recovery of the solid, water may be added to the aqueous mixture prior to allowing the solid to settle. Water may be added to the aqueous mixture in a volume relative to the volume of the aqueous mixture of from 0.1:1 to 0.75:1. Alternatively, but less preferably, the solid may be separated from the mixture by centrifugation without first allowing the solid to settle and/or without the addition of water. Alternatively, the aqueous mixture may be spray dried to separate the solid catalyst material from the aqueous mixture.

The preferred catalyst material may be washed subsequent to separation from the aqueous mixture, if desired. Substantial volumes of water may be used to wash the separated catalyst material since the separated catalyst material is insoluble in water, and the yield of catalyst material will not be significantly affected by the wash.

Process for Cracking a Hydrocarbon-Containing Feedstock

In the process of the present invention, a catalyst as described above, the hydrocarbon-containing feedstock, hydrogen sulfide, and hydrogen are mixed, preferably blended, at a temperature of from 375° C. to 500° C. and a total pressure of 6.9 MPa to 27.5MPa. The hydrocarbon-containing feedstock, the catalyst, hydrogen sulfide, and hydrogen may be mixed by contact with each other in a mixing zone maintained at a temperature of from 375° C. to 500° C. and a total pressure of 6.9 MPa to 27.5 MPa. The hydrogen sulfide is provided to be mixed with the hydrocarbon-containing feedstock, hydrogen, and catalyst(s) in a mole ratio of hydrogen sulfide to hydrogen of at least 0.5:9.5, where the combined hydrogen and hydrogen sulfide partial pressures provide at least 60% of the total pressure. A vapor that comprises hydrocarbons that are a gas at the temperature and pressure within the mixing zone is separated from the mixing zone., Apart from the mixing zone, a hydrocarbon-containing product that comprises one or more hydrocarbon compounds that are liquid at STP may be condensed from the vapor separated from the mixing zone. Alternatively, apart from the mixing zone the vapor separated from the mixing zone may be hydrotreated to reduce sulfur, nitrogen, and olefinic hydrocarbon content by contacting the vapor with a commercially available hydrotreating catalyst and hydrogen at a temperature of from 260° C. to 425° C. and a total pressure of from 3.4 MPa to 27.5 MPa.

In an embodiment of the process of the invention, as shown in FIG. 1, the mixing zone 1 may be in a reactor 3, where the conditions of the reactor 3 may be controlled to maintain the temperature and total pressure in the mixing zone 1 at 375° C. to 500° C. and 6.9 MPa to 27.5 MPa, respectively. The hydrocarbon-containing feedstock may be provided continuously or intermittently from a feed supply 2 to the mixing zone 1 in the reactor 3 through feed inlet 5. The hydrocarbon-containing feedstock may be preheated to a temperature of from 100° C. to 350° C. by a heating element 4, which may be a heat exchanger, prior to being fed to the mixing zone 1.

The hydrocarbon-containing feedstock may be provided to the mixing zone 1 of the reactor 3 at a rate of at least 350 kg/hr per $m^3$ of the mixture volume within mixing zone 1 of the reactor 3. The mixture volume is defined herein as the combined volume of the catalyst, the hydrocarbon-depleted feed residuum (as defined herein), and the hydrocarbon-containing feedstock in the mixing zone 1, where the hydrocarbon-depleted feed residuum may contribute no volume to the mixture volume (i.e. at the start of the process before a hydrocarbon-depleted feed residuum has been produced in the mixing zone 1), and where the hydrocarbon-containing feedstock may contribute no volume to the mixture volume (i.e. after initiation of the process during a period between intermittent addition of fresh hydrocarbon-containing feedstock into the mixing zone 1). The mixture volume within the mixing zone 1 may be affected by 1) the rate of addition of the hydrocarbon-containing feedstock into the mixing zone 1; 2) the rate of removal of the vapor from the reactor 3; and, optionally, 3) the rate at which a bleed stream of the hydrocarbon-depleted feed residuum, catalyst, and hydrocarbon-containing feedstock is separated from and recycled to the reactor 3, as described in further detail below. The hydrocarbon-containing feedstock may be provided to the mixing zone 1 of the reactor 3 at a rate of at least 500, or at least 600, or at least 700, or at least 800, or at least 900, or at least 1000 kg/hr per $m^3$ of the mixture volume within the mixing zone 1 up to 5000 kg/hr per $m^3$ of the mixture volume within the mixing zone 1.

Preferably, the mixture volume of the hydrocarbon-containing feedstock, the hydrocarbon-depleted feed residuum, and the catalyst is maintained within the mixing zone within a selected range of the reactor volume by selecting 1) the rate at which the hydrocarbon-containing feedstock is provided to the mixing zone 1; and/or 2) the rate at which a bleed stream is removed from and recycled to the mixing zone 1; and/or 3) the temperature and pressure within the mixing zone 1 and the reactor 3 to provide a selected rate of vapor removal from the mixing zone 1 and the reactor 3. The combined volume of the hydrocarbon-containing feedstock and the catalyst initially provided to the mixing zone 1 at the start of the process define an initial mixture volume, and the amount of hydrocarbon-containing feedstock and the amount of the catalyst initially provided to the mixing zone 1 may be selected to provide an initial mixture volume of from 5% to 97% of the reactor volume, preferably from 30% to 75% of the reactor volume. The rate at which the hydrocarbon-containing feedstock is provided to the mixing zone 1 and/or the rate at which a bleed stream is removed from and recycled to the mixing zone 1 and/or the rate at which vapor is removed from the reactor 3 and/or the temperature and total pressure within the mixing zone 1 and/or the reactor 3 may be selected to maintain the mixture volume of the hydrocarbon-containing feedstock, the hydrocarbon-depleted feed residuum, and the catalyst at a level of at least 10%, or at least 25%, or at least 40%, or at least 50%, or within 70%, or within 50%, or from 10% to 1940%, or from 15% to 1000%, or from 20% to 500%, or from 25% to 250%, or from 50% to 200% of the initial mixture volume during the process.

The hydrocarbon-containing feedstock may be provided to the mixing zone 1 at such relatively high rates for reacting a feedstock containing relatively large quantities of heavy, high molecular weight hydrocarbons due to the inhibition of coke formation in the process of the present invention. Conventional processes for cracking heavy hydrocarbonaceous feedstocks are typically operated at rates on the order of 10 to 300 kg/hr per $m^3$ of reaction volume so that the conventional cracking process may be conducted either 1) at sufficiently low temperature to avoid excessive coke-make to maximize yield of desirable cracked hydrocarbons; or 2) at higher temperatures with significant quantities of coke production, where the high levels of solids produced impedes operation of the process at a high rate.

Hydrogen is provided to the mixing zone 1 of the reactor 3 for mixing or blending with the hydrocarbon-containing feedstock the catalyst, and hydrogen sulfide. Hydrogen may be provided continuously or intermittently to the mixing zone 1 of the reactor 3 through hydrogen inlet line 7, or, alternatively, may be mixed together with the hydrocarbon-containing feedstock, and optionally the catalyst, and provided to the mixing zone 1 through the feed inlet 5. Hydrogen may be provided to the mixing zone 1 of the reactor 3 at a rate sufficient to hydrogenate hydrocarbons cracked in the process. The hydrogen may be provided to the mixing zone 1 in a ratio relative to the hydrocarbon-containing feedstock provided to the mixing zone 1 of from 1 $Nm^3/m^3$ to 16,100 $Nm^3/m^3$ (5.6 SCFB to 90160 SCFB), or from 2 $Nm^3/m^3$ to 8000 $Nm^3/m^3$ (11.2 SCFB to 44800 SCFB), or from 3 $Nm^3/m^3$ to 4000 $Nm^3/m^3$ (16.8 SCFB to 22400 SCFB), or from 5 $Nm^3/m^3$ to 320 $Nm^3/m^3$ (28 SCFB to 1792 SCFB). The hydrogen partial pressure in the mixing zone 1 may be maintained in a pressure range of from 2.1 MPa to 27.5 MPa, or from 5 MPa to 20 MPa, or from 10 MPa to 15 MPa.

Hydrogen sulfide is provided continuously or intermittently to the mixing zone 1 of the reactor 3 to be mixed or blended with the hydrocarbon-containing feedstock, hydrogen, and the catalyst in the mixing zone of the reactor. The hydrogen sulfide may be provided continuously or intermittently to the mixing zone 1 of the reactor 3 as a liquid or a gas. The hydrogen sulfide may be mixed with the hydrocarbon-containing feedstock and provided to the mixing zone 1 with the hydrocarbon-containing feedstock through the feed inlet 5. Alternatively, the hydrogen sulfide may be mixed with hydrogen and provided to the mixing zone 1 through the hydrogen inlet line 7. Alternatively, the hydrogen sulfide may be provided to the mixing zone 1 through a hydrogen sulfide inlet line 27.

It is believed that hydrogen sulfide acts as a further catalyst in cracking hydrocarbons in the hydrocarbon-containing feedstock in the presence of hydrogen and the catalyst and lowers the activation energy to crack hydrocarbons in the hydrocarbon-containing feed stock, thereby increasing the rate of the reaction. The rate of the process, in particular the rate that the hydrocarbon-containing feedstock may be provided to the mixing zone 1 for cracking and cracked product may be removed from the reactor 3, therefore, may be greatly increased with the use of significant quantities of hydrogen sulfide in the process. For example, the rate of the process may be increased by at least 1.5 times, or by at least 2 times, the rate of the process in the absence of significant quantities of hydrogen sulfide.

As discussed above, it is also believed that the hydrogen sulfide acting as a further catalyst inhibits coke formation under cracking conditions. Use of sufficient hydrogen sulfide in the process permits the process to be effected at a mixing zone temperature of at least at least 430° C. or at least 450° C. with little or no increase in coke formation relative to cracking conducted at lower temperatures since hydrogen sulfide inhibits coke formation. The rate of the process, in particular the rate that the hydrocarbon-containing feedstock may be provided to the mixing zone 1 for cracking and cracked product may be removed from the reactor 3, therefore, may be greatly increased with the use of significant quantities of hydrogen sulfide in the process since the rate of reaction in the process increases significantly relative to temperature, and the reaction may be conducted at higher temperatures in the presence of hydrogen sulfide without significant coke production.

The hydrogen sulfide provided to be mixed with the hydrocarbon-containing feedstock, hydrogen, and the catalyst may be provided in an amount effective to increase the rate of the cracking reaction. In order to increase the rate of the cracking reaction, hydrogen sulfide may be provided in an amount on a mole ratio basis relative to hydrogen provided to be mixed with the hydrocarbon-containing feedstock and catalyst, of at least 0.5 mole of hydrogen sulfide per 9.5 moles hydrogen, where the combined hydrogen sulfide and hydrogen partial pressures are maintained to provide at least 60%, or at least 70%, or at least 80%, or at least 90%, or at least 95% of the total pressure in the reactor. The hydrogen sulfide may be provided in an amount on a mole ratio basis relative to the hydrogen provided of at least 1:9, or at least 1.5:8.5, or at least 2.5:7.5, or at least 3:7 or at least 3.5:6.5, or at least 4:6, up to 1:1, where the combined hydrogen sulfide and hydrogen partial pressures are maintained to provide at least 60%, or at least 70%, or at least 80%, or at least 90%, or at least 95% of the total pressure in the reactor. The combined partial pressure of the hydrogen sulfide and hydrogen in the reactor may be maintained to provide at least 60% of the total pressure in the reactor, where the hydrogen sulfide partial pressure is maintained at a level of at least 5% of the hydrogen partial pressure. The hydrogen sulfide partial pressure in the reactor may be maintained in a pressure range of from 0.4 MPa to 13.8 MPa, or from 2 MPa to 10 MPa, or from 3 MPa to 7 MPa.

Other gases may be present in the reactor in minor amounts that provide a pressure contributing to the total pressure in the reactor. For example, a non-condensable gas produced in the vapor along with the hydrocarbon-containing product may be separated from the hydrocarbon-containing product and recycled back into the mixing zone, where the non-condensable gas may comprise hydrocarbon gases such as methane, ethane, and propane as well as hydrogen sulfide and hydrogen. An inert gas such as nitrogen may also be provided to the mixing zone 1 of the reactor 3 to increase the pressure in the mixing zone.

The catalyst may be located in the mixing zone 1 in the reactor 3 or may be provided to the mixing zone 1 in the reactor 3 during the process of the present invention. Catalysts that may be utilized in the process are as described above, and exclude catalysts exhibiting significant acidity including catalysts having an acidity as measured by ammonia chemisorption of more than 200 μmol ammonia per gram of catalyst. The catalyst may be located in the mixing zone 1 in a catalyst bed. Preferably, however, the catalyst is provided to the mixing zone 1 during the process, or, if located in the mixing zone initially, may be blended with the hydrocarbon-containing feed, hydrogen sulfide, and hydrogen, and is not present in a catalyst bed. The catalyst may be provided to the mixing zone 1 together with the hydrocarbon-containing feedstock through feed inlet 5, where the catalyst may be dispersed in the hydrocarbon-containing feedstock prior to feeding the mixture to the mixing zone 1 through the feed inlet 5. Alternatively, the catalyst may be provided to the mixing zone 1 through a catalyst inlet 9, where the catalyst may be mixed with sufficient hydrocarbon-containing feedstock or another fluid, for example a hydrocarbon-containing fluid, to enable the catalyst to be delivered to the mixing zone 1 through the catalyst inlet 9.

The catalyst is provided to be mixed with the hydrocarbon-containing feedstock, hydrogen sulfide, and the hydrogen in the mixing zone 1 in a sufficient amount to catalytically crack the hydrocarbon-containing feedstock and/or to catalyze hydrogenation of the cracked hydrocarbons in the mixing zone. An initial charge of the catalyst may be provided for mixing with an initial charge of hydrocarbon-containing feedstock in an amount of from 20 g to 125 g of catalyst per kg of initial hydrocarbon-containing feedstock. Over the course of the process, the catalyst may be provided for mixing with the hydrocarbon-containing feedstock and hydrogen in an amount of from 0.125 g to 5 g of catalyst per kg of hydrocarbon-containing feedstock. Alternatively, the catalyst may be provided for mixing with the hydrocarbon-containing feedstock and hydrogen over the course of the process in an amount of from 0.125 g to 50 g of catalyst per kg of hydrocarbons in the hydrocarbon-containing feedstock having a boiling point of at least 538° C. at a pressure of 0.101 MPa.

The catalyst, the hydrocarbon-containing feedstock, the hydrogen sulfide, and the hydrogen may be mixed by being blended into an intimate admixture in the mixing zone 1. The catalyst, hydrocarbon-containing feedstock, the hydrogen sulfide, and the hydrogen may be blended in the mixing zone 1, for example, by stiffing a mixture of the components, for example by a mechanical stiffing device located in the mixing zone 1. The catalyst, hydrocarbon-containing feedstock, hydrogen sulfide, and hydrogen may also be mixed in the mixing zone 1 by blending the components prior to providing the components to the mixing zone 1 and injecting the blended components into the mixing zone 1 through one or more nozzles which may act as the feed inlet 5. The catalyst, hydrocarbon-containing feedstock, hydrogen sulfide, and hydrogen may also be blended in the mixing zone 1 by blending the hydrocarbon-containing feedstock and catalyst and injecting the mixture into the mixing zone 1 through one or more feed inlet nozzles positioned with respect to the hydrogen inlet line 7 and the hydrogen sulfide inlet line 27 such that the mixture is blended with hydrogen and hydrogen sulfide entering the mixing zone 1 through the hydrogen inlet line 7 and the hydrogen sulfide inlet line 27, respectively. Baffles may be included in the reactor 3 in the mixing zone 1 to facilitate blending the hydrocarbon-containing feedstock, catalyst, hydrogen sulfide, and hydrogen. Less preferably, the catalyst is present in the mixing zone 1 in a catalyst bed, and the hydrocarbon-containing feedstock, hydrogen, hydrogen sulfide and catalyst are mixed by bringing the hydrocarbon-containing feedstock and hydrogen simultaneously into contact with the catalyst in the catalyst bed.

The temperature and pressure conditions in the mixing zone 1 are maintained so that heavy hydrocarbons in the hydrocarbon-containing feedstock may be cracked. The temperature in the mixing zone 1 is maintained from 375° C. to 500° C. Preferably, the mixing zone 1 is maintained at a temperature of from 425° C. to 500° C., or from 430° C. to 500° C., or from 440° C. to 500° C., or from 450° C. to 500° C. In an embodiment of the process of the present invention, the temperature within the mixing zone is selected and controlled to be at least 430° C., or at least 450° C. Higher temperatures may be preferred in the process of the present invention since 1) the rate of conversion of the hydrocarbon-containing feedstock to a hydrocarbon-containing product significantly increases with temperature; and 2) the present process inhibits or prevents the formation of coke, even at temperatures of 430° C. or greater, or 450° C. or greater, which typically occurs rapidly in conventional cracking processes at temperatures of 430° C. or greater, or 450° C. or greater.

Mixing the hydrocarbon-containing feedstock, the catalyst(s), hydrogen sulfide, and hydrogen in the mixing zone 1 at a temperature of from 375° C. to 500° C. and a total pressure of from 6.9 MPa to 27.5 MPa produces a vapor comprised of hydrocarbons that are vaporizable at the temperature and pressure within the mixing zone 1. The vapor may be comprised of hydrocarbons present initially in the hydrocarbon-containing feedstock that vaporize at the temperature and pressure within the mixing zone 1 and hydrocarbons that are not present initially in the hydrocarbon-containing feedstock but are produced by cracking and hydrogenating hydrocarbons initially in the hydrocarbon-containing feedstock that were not vaporizable at the temperature and pressure within the mixing zone 1 prior to cracking.

At least a portion of the vapor comprised of hydrocarbons that are vaporizable at the temperature and pressure within the mixing zone 1 may be continuously or intermittently separated from the mixing zone 1 containing the mixture of hydrocarbon-containing feedstock, hydrogen, hydrogen sulfide and catalyst since the more volatile vapor physically separates from the hydrocarbon-containing feedstock, catalyst, hydrogen sulfide and hydrogen mixture. The vapor may also contain hydrogen gas and hydrogen sulfide gas, which also separate from the mixture in the mixing zone 1.

Separation of the vapor from the mixture in the mixing zone 1 leaves a hydrocarbon-depleted feed residuum from which the hydrocarbons present in the vapor have been removed. The hydrocarbon-depleted feed residuum is comprised of hydrocarbons that are liquid at the temperature and pressure within the mixing zone 1. The hydrocarbon-depleted feed residuum may also be comprised of solids such as metals freed from cracked hydrocarbons and minor amounts of coke. The hydrocarbon-depleted feed residuum may contain little coke or proto-coke since the process of the present invention inhibits the generation of coke. The hydrocarbon-depleted feed residuum may contain, per metric ton of hydrocarbon feedstock provided to the mixing zone 1, less than 10 kg, or at most 5 kg, or at most 1 kg of hydrocarbons insoluble in toluene as measured by ASTM Method D4072.

At least a portion of the hydrocarbon-depleted feed residuum is retained in the mixing zone 1 while the vapor is separated from the mixing zone 1. The portion of the hydrocarbon-depleted feed residuum retained in the mixing zone 1 may be subject to further cracking to produce more vapor that may be separated from the mixing zone 1 and then from the reactor 3 from which the liquid hydrocarbon-containing product may be produced by cooling. Hydrocarbon-containing feedstock, hydrogen sulfide, and hydrogen may be continuously or intermittently provided to the mixing zone 1 at the rates described above and mixed with the catalyst and the hydrocarbon-depleted feed residuum retained in the mixing zone 1 to produce further vapor comprised of hydrocarbons that are vaporizable at the temperature and pressure within the mixing zone 1 for separation from the mixing zone 1 and the reactor 3.

At least a portion of the vapor separated from the mixture of the hydrocarbon-containing feedstock, hydrogen, and catalyst may be continuously or intermittently separated from the mixing zone 1 while retaining the hydrocarbon-depleted feed residuum, catalyst, and any fresh hydrocarbon-containing feedstock in the mixing zone 1. At least a portion of the vapor separated from the mixing zone 1 may be continuously or intermittently separated from the reactor 3 through a reactor product outlet 11. The reactor 3 is preferably configured and operated so that substantially only vapors and gases may exit the reactor product outlet 11, where the vapor product exiting the reactor 3 comprises at most 5 wt. %, or at most 3 wt. %, or at most 1 wt. %, or at most 0.5 wt. %, or at most 0.1 wt. %, or at most 0.01 wt. %, or at most 0.001 wt. % solids and liquids at the temperature and pressure at which the vapor product exits the reactor 3.

A stripping gas may be injected into the reactor 3 over the mixing zone 1 to facilitate separation of the vapor from the mixing zone 1. The stripping gas may be heated to a temperature at or above the temperature within the mixing zone 1 to assist in separating the vapor from the mixing zone 1. In an embodiment of the process, the stripping gas may be hydrogen gas and/or hydrogen sulfide gas.

Figure 2:
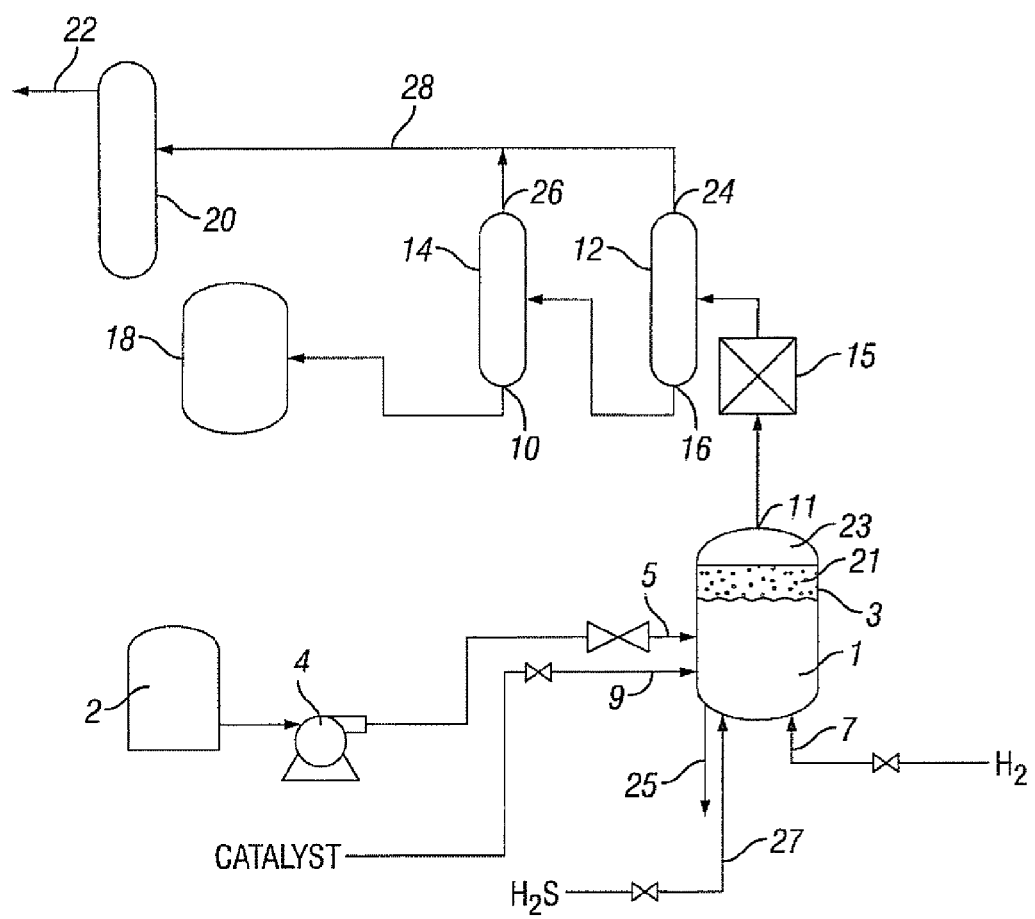
FIG. 2 is a schematic of a system useful for practicing the process of the present invention including a reactor having three zones.

As shown in FIG. 2, the reactor 3 may be comprised of a mixing zone 1, a disengagement zone 21, and a vapor/gas zone 23. The vapor comprised of hydrocarbons that are vaporizable at the temperature and pressure within the mixing zone 1 may separate from the mixture of hydrocarbon-depleted residuum, catalyst, hydrogen sulfide, hydrogen, and fresh hydrocarbon-containing feed, if any, in mixing zone 1 into the disengagement zone 21. A stripping gas such as hydrogen may be injected into the disengagement zone 21 to facilitate separation of the vapor from the mixing zone 1. Some liquids and solids may be entrained by the vapor as it is separated from the mixing zone 1 into the disengagement zone 21, so that the disengagement zone 21 contains a mixture of vapor and liquids, and potentially solids. At least a portion of the vapor separates from the disengagement zone 21 into the vapor/gas zone 23, where the vapor separating from the disengagement zone 21 into the vapor/gas zone 23 contains little or no liquids or solids at the temperature and pressure within the vapor/gas zone. At least a portion of the vapor in the vapor/gas zone 23 exits the reactor 3 through the reactor product outlet 11.

Referring now to FIGS. 1 and 2, in the process of the present invention, the hydrocarbons in the hydrocarbon-containing feed and hydrocarbon-containing feed residuum are contacted and mixed with the catalyst, hydrogen sulfide, and hydrogen in the mixing zone 1 of the reactor 3 only as long as necessary to be vaporized and separated from the mixture, and are retained in the reactor 3 only as long as necessary to be vaporized and exit the reactor product outlet 11. Low molecular weight hydrocarbons having a low boiling point may be vaporized almost immediately upon being introduced into the mixing zone 1 when the mixing zone 1 is maintained at a temperature of 375° C. to 500° C. and a total pressure of from 6.9 MPa to 27.5 MPa. These hydrocarbons may be separated rapidly from the reactor 3. High molecular weight hydrocarbons having a high boiling point, for example hydrocarbons having a boiling point greater than 538° C. at 0.101 MPa, may remain in the mixing zone 1 until they are cracked and hydrogenated into hydrocarbons having a boiling point low enough to be vaporized at the temperature and pressure in the mixing zone 1 and to exit the reactor 3. The hydrocarbons of the hydrocarbon-containing feed, therefore, are contacted and mixed with the catalyst, hydrogen sulfide, and hydrogen in the mixing zone 1 of the reactor 3 for a variable time period, depending on the boiling point of the hydrocarbons under the conditions in the mixing zone 1 and the reactor 3.

The rate of the process of producing the vapor product from the hydrocarbon-containing feedstock may be adjusted by selection of the temperature and/or total pressure in the reactor 3, and particularly in the mixing zone 1, within the temperature range of 375° C.-500° C. and within the pressure range of 6.9 MPa-27.5 MPa. Increasing the temperature and/or decreasing the pressure in the mixing zone 1 permits the hydrocarbon-containing feedstock to provided to the reactor 3 at an increased rate and the vapor product to be removed from the reactor 3 at an increased rate since the hydrocarbons in the hydrocarbon-containing feedstock may experience a decreased residence time in the reactor 3 due to higher cracking activity and/or faster vapor removal. Conversely, decreasing the temperature and/or increasing the pressure in the mixing zone 1 may reduce the rate at which the hydrocarbon-containing feedstock may be provided to the reactor 3 and the vapor product may be removed from the reactor 3 since the hydrocarbons in the hydrocarbon-containing feedstock may experience an increased residence time in the reactor 3 due to lower cracking activity and/or slower vapor removal.

As a result of the inhibition and/or prevention of the formation of coke in the process, the hydrocarbons in the hydrocarbon-containing feed may be contacted and mixed with the catalyst and hydrogen in the mixing zone 1 at a temperature of 375° C. to 500° C. and a total pressure of 6.9 MPa to 27.5 MPa for as long as necessary to be vaporized, or to be cracked, hydrogenated, and vaporized. It is believed that high boiling, high molecular weight hydrocarbons may remain in the mixing zone 1 in the presence of cracked hydrocarbons since the catalyst promotes the formation of hydrocarbon radical anions upon cracking that react with hydrogen to form stable hydrocarbon products rather than hydrocarbon radical cations that react with other hydrocarbons to form coke. Coke formation is also avoided because the cracked hydrogenated hydrocarbons preferentially exit the mixing zone 1 as a vapor rather remaining in the mixing zone 1 to combine with hydrocarbon radicals in the mixing zone 1 to form coke or protocoke.

At least a portion of the vapor separated from the mixing zone 1 and separated from the reactor 3 may be condensed apart from the mixing zone 1 to produce a liquid hydrocarbon-containing product. Referring now to FIG. 1, the portion of the vapor separated from the reactor 3 may be provided to a condenser 13 wherein at least a portion of the vapor separated from the reactor 3 may be condensed to produce the hydrocarbon-containing product that is comprised of hydrocarbons that are liquid at STP. A portion of the vapor separated from the reactor 3 may be passed through a heat exchanger 15 to cool the vapor prior to providing the vapor to the condenser 13.

Condensation of the liquid hydrocarbon-containing product from the vapor separated from the reactor 3 may also produce a non-condensable gas that may be comprised of hydrocarbons having a carbon number from 1 to 6, hydrogen, and hydrogen sulfide. The condensed hydrocarbon-containing liquid product may be separated from the non-condensable gas through a condenser liquid product outlet 17 and stored in a product receiver 18, and the non-condensable gas may be separated from the condenser 13 through a non-condensable gas outlet 19 and passed through an amine or caustic scrubber 20 and recovered through a gas product outlet 22.

Alternatively, referring now to FIG. 2, the portion of the vapor separated from the reactor 3 may be provided to a high pressure separator 12 to separate a liquid hydrocarbon-containing product from gases not condensable at the temperature and pressure within the high pressure separator 12, and the liquid hydrocarbon-containing product collected from the high pressure separator may be provided through line 16 to a low pressure separator 14 operated at a pressure less than the high pressure separator 12 to separate the liquid hydrocarbon-containing product from gases that are not condensable at the temperature and pressure at which the low pressure separator 14 is operated. The vapor/gas exiting the reactor 3 from the reactor product outlet 11 may be cooled prior to being provided to the high pressure separator 12 by passing the vapor/gas through heat exchanger 15. The condensed hydrocarbon-containing liquid product may be separated from the non-condensable gas in the low pressure separator through a low pressure separator liquid product outlet 10 and stored in a product receiver 18. The non-condensable gas may be separated from the high pressure separator 12 through a high pressure non-condensable gas outlet 24 and from the low pressure separator 14 through a low pressure non-condensable gas outlet 26. The non-condensable gas streams may be combined in line 28 and passed through an amine or caustic scrubber 20 and recovered through a gas product outlet 22.

Alternatively, the vapor separated from the mixing zone 1 and from the reactor 3 may be further hydroprocessed without condensing the hydrocarbon-containing product from the vapor. For example, the vapor separated from the reactor may be hydrotreated to reduce sulfur, nitrogen, and olefins in the hydrocarbon-containing product by passing the vapor from the reactor 3 to a hydroprocessing reactor, where the vapor may be contacted with a conventional hydroprocessing catalyst and hydrogen at a temperature of from 260° C. to 425° C. and a total pressure of from 3.4 MPa to 27.5 MPa.

A portion of the hydrocarbon-depleted feed residuum and catalyst may be separated from the mixing zone to remove solids including metals and hydrocarbonaceous solids including coke from the hydrocarbon-depleted feed residuum Referring now to FIGS. 1 and 2, the reactor 3 may include a bleed stream outlet 25 for removal of a stream of hydrocarbon-depleted feed residuum and catalyst from the mixing zone 1 and the reactor 3. The bleed stream outlet 25 may be operatively connected to the mixing zone 1 of the reactor 3.

A portion of the hydrocarbon-depleted feed residuum and the catalyst may be removed together from the mixing zone 1 and the reactor 3 through the bleed stream outlet 25 while the process is proceeding. Solids and the catalyst may be separated from a liquid portion of the hydrocarbon-depleted feed residuum in a solid-liquid separator 30. The solid-liquid separator 30 may be a filter or a centrifuge. The liquid portion of the hydrocarbon-depleted feed residuum may be recycled back into the mixing zone 1 via a recycle inlet 32 for further processing or may be combined with the hydrocarbon-containing feed and recycled into the mixing zone 1 through the feed inlet 5.

The vapor separated from the mixing zone 1 and from the reactor 3 through the reactor product outlet 11 may contain hydrogen sulfide. The hydrogen sulfide in the vapor product may be separated from the hydrocarbon-containing liquid product in the condenser 13 (FIG. 1) or in the high and low pressure separators 12 and 14 (FIG. 2), where the hydrogen sulfide may form a portion of the non-condensable gas. It is preferable to condense the hydrocarbon-containing liquid product at a temperature of from 60° C. to 93° C. (140° F.-200° F.) so that hydrogen sulfide is separated from the hydrocarbon-containing liquid product with the non-condensable gas rather than condensing with the liquid hydrocarbon-containing product. The non-condensable gas including the hydrogen sulfide may be recovered from the condenser 13 through the gas product outlet 19 (FIG. 1) or from the high pressure separator 12 through high pressure separator gas outlet 24 and the low pressure separator gas outlet 26 (FIG. 2). The hydrogen sulfide may be separated from the other components of the non-condensable gas by treatment of the non-condensable gas to recover the hydrogen sulfide. For example, the non-condensable gas may be scrubbed with an amine solution in the scrubber 20 to separate the hydrogen sulfide from the other components of the non-condensable gas. The hydrogen sulfide may then be recovered from the amine solution and recycled back into the mixing zone 1.

Alternatively, the vapor containing hydrogen sulfide may be hydroprocessed as described above by contacting the vapor with a hydroprocessing catalyst and hydrogen at a temperature of from 260° C. to 425° C. and a total pressure of from 3.4 MPa to 27.5 MPa without first condensing a liquid hydrocarbon-containing product. The hydrotreated vapor may contain hydrocarbons that are liquid at STP that may be condensed and separated from non-condensable hydrocarbons, hydrogen, and hydrogen sulfide. The non-condensable hydrocarbons, hydrogen, and hydrogen sulfide may be recycled into the mixing zone, or the hydrogen sulfide may be separated from the non-condensable hydrocarbons and hydrogen by scrubbing with an amine solution, where the separated hydrogen sulfide may be regenerated from the amine solution and recycled to the mixing zone.

The process of the present invention may be effected for a substantial period of time on a continuous or semi-continuous basis, in part because the process generates little or no coke. The hydrocarbon-containing feedstock, hydrogen, catalyst, and hydrogen sulfide may be continuously or intermittently provided to the mixing zone 1 in the reactor 3, where the hydrocarbon-containing feedstock may be provided at a rate of at least 350 kg/hr per $m^3$ of the mixture volume as defined above, and mixed in the mixing zone 1 at a temperature of from 375° C.-500° C. and a total pressure of from 6.9 MPa-27.5 MPa for a period of at least 40 hours, or at least 100 hours, or at least 250 hours, or at least 500 hours, or at least 750 hours to generate the vapor comprised of hydrocarbons that are vaporizable at the temperature and pressure in the mixing zone 1 and the hydrocarbon-depleted feed residuum, as described above. The vapor may be continuously or intermittently separated from the mixing zone 1 and the reactor 3 over substantially all of the time period that the hydrocarbon-containing feedstock, catalyst, hydrogen, and hydrogen sulfide, if any, are mixed in the mixing zone 1. Fresh hydrocarbon-containing feedstock, hydrogen, and hydrogen sulfide may be blended with the hydrocarbon-depleted feed residuum and catalyst in the mixing zone 1 over the course of the time period of the reaction as needed. In a preferred embodiment, fresh hydrocarbon-containing feedstock, hydrogen, and hydrogen sulfide, if any, are provided continuously to the mixing zone 1 over substantially all of the time period the reaction is effected. Solids may be removed from the mixing zone 1 continuously or intermittently over the time period the process is run by separating a bleed stream of the hydrocarbon-containing feed residuum from the mixing zone 1 and the reactor 3, removing the solids from the bleed stream, and recycling the bleed stream from which the solids have been removed back into the mixing zone 1 as described above.

The process of the present invention may produce, in part, a hydrocarbon-containing product that is a liquid at STP. The hydrocarbon-containing product may contain less than 4 wt. %, or less than 3 wt. %, or at most 2 wt. %, or at most 1 wt. %, or at most 0.5 wt. % of hydrocarbons having a boiling point of greater than 538° C. as determined in accordance with ASTM Method D5307 and may contain at most 0.5 wt. % or at most 0.25 wt. %, or at most 0.1 wt. % coke as determined in accordance with ASTM Method D4072. Furthermore, the hydrocarbon-containing product may contain at least 80%, or at least 85%, or at least 90%, or at least 95%, or at least 97% of the atomic carbon present in the hydrocarbon-containing feedstock. Therefore, when the process of the present invention is utilized, most of the hydrocarbons in the hydrocarbon-containing feedstock may be recovered in the hydrocarbon-containing product that is liquid at STP, and little of the hydrocarbons in the hydrocarbon-containing feedstock are converted to coke or gas.

The hydrocarbon-containing product may contain VGO hydrocarbons, distillate hydrocarbons, and naphtha hydrocarbons. The hydrocarbon-containing product may contain, per gram, at least 0.05 grams, or at least 0.1 grams of hydrocarbons having a boiling point from the initial boiling point of the hydrocarbon-containing product up to 204° C. (400° F.). The hydrocarbon-containing product may also contain, per gram, at least 0.1 grams, or at least 0.15 grams of hydrocarbons having a boiling point of from 204° C. (400° F.) up to 260° C. (500° F.). The hydrocarbon-containing product may also contain, per gram, at least 0.25 grams, or at least 0.3 grams, or at least 0.35 grams of hydrocarbons having a boiling point of from 260° C. (500° F.) up to 343° C. (650° F.). The hydrocarbon-containing product may also contain, per gram, at least 0.3 grams, or at least 0.35 grams, or at least 0.4, or at least 0.45 grams of hydrocarbons having a boiling point of from 343° C. (500° F.) up to 538° C. (1000° F.). The relative amounts of hydrocarbons within each boiling range and the boiling range distribution of the hydrocarbons may be determined in accordance with ASTM Method D5307.

The hydrocarbon-containing product produced by the process of the present invention may contain significant amounts of sulfur, provided the hydrocarbon-containing product is condensed from the vapor separated from the mixing zone without first hydroprocessing the vapor. The hydrocarbon-containing product may contain, per gram, at least 0.0005 gram of sulfur or at least 0.001 gram of sulfur. The sulfur content of the hydrocarbon-containing product may be determined in accordance with ASTM Method D4294. At least 40 wt. % of the sulfur may be contained in hydrocarbon compounds having a carbon number of 17 or less as determined by two-dimensional GC-GC sulfur chemiluminscence, where at least 60 wt. % of the sulfur in the sulfur-containing hydrocarbon compounds having a carbon number of 17 or less may be contained in benzothiophenic compounds as determined by GC-GC sulfur chemiluminscence.

The hydrocarbon-containing product produced by the process of the present invention may contain significant amounts of nitrogen, provided the hydrocarbon-containing product is condensed from the vapor separated from the mixing zone without first hydroprocessing the vapor. The hydrocarbon-containing product produced by the process of the present invention may contain, per gram, at least 0.0005 gram or at least 0.001 gram of nitrogen as determined in accordance with ASTM Method D5762. The hydrocarbon-containing product may have a relatively low ratio of basic nitrogen compounds to other nitrogen containing compounds therein. The nitrogen may be contained in hydrocarbon compounds, where at least 30 wt. % of the nitrogen in the hydrocarbon composition is contained in nitrogen-containing hydrocarbon compounds having a carbon number of 17 or less and where at least 50 wt. % of the nitrogen-containing hydrocarbon compounds having a carbon number of 17 or less are acridinic and carbazolic compounds. The amount of nitrogen-containing hydrocarbon compounds having a carbon number of 17 or less relative to the amount of nitrogen in all nitrogen-containing hydrocarbon compounds in the hydrocarbon-containing product and the relative amount of acridinic and carbazolic compounds may be determined by nitrogen chemiluminscence two dimensional gas chromatography (GCxGC-NCD).

The hydrocarbon-containing product produced by the process of the present invention may contain significant quantities of aromatic hydrocarbon compounds. The hydrocarbon-containing product may contain, per gram, at least 0.3 gram, or at least 0.35 gram, or at least 0.4 gram, or at least 0.45 gram, or at least 0.5 gram of aromatic hydrocarbon compounds.

The hydrocarbon-containing product of the process of the present invention may contain relatively few polyaromatic hydrocarbon compounds containing three or more aromatic ring structures (e.g. anthracene, phenanthrene) relative to mono-aromatic and di-aromatic hydrocarbon compounds. The combined mono-aromatic and di-aromatic hydrocarbon compounds in the hydrocarbon-containing product may be present in the hydrocarbon-containing product in a weight ratio relative to the polyaromatic hydrocarbon compounds (containing three or more aromatic ring structures) of at least 1.5:1.0, or at least 2.0:1.0, or at least 2.5:1.0. The relative amounts of mono-aromatic, di-aromatic, and polyaromatic compounds in the hydrocarbon-containing product may be determined by flame ionization detection-two dimensional gas chromatography (GCxGC-FID).

The hydrocarbon-containing product of the process of the present invention may contain olefins, where a significant amount of the olefins may be alpha olefins having a terminal double bond. Olefin content in the hydrocarbon-containing product may be determined in accordance with ASTM Method D6730. The hydrocarbon-containing product may contain, per gram, at least 0.05 grams, or at least 0.1 grams of alpha olefins. The alpha olefins in the hydrocarbon-containing product may be present in the hydrocarbon-containing product relative to olefins having an internal double bond in a weight ratio of alpha olefins to internal double bond olefins is at least 0.7:1.0, or at least 0.9:1.0, or at least 1.0:1.0.

The hydrocarbon-containing product of the process of the present invention may contain paraffins, where a significant amount of the paraffins may be n-paraffins. Paraffin content in the hydrocarbon-containing product may be determined in accordance with ASTM Method D6730. The n-paraffins in the hydrocarbon-containing product may be present relative to isoparaffins in a weight ratio of isoparaffins to n-paraffins of at most 1.4:1.0, or at most 1.0:1.0.

To facilitate a better understanding of the present invention, the following examples of certain aspects of some embodiments are given. In no way should the following examples be read to limit, or define, the scope of the invention.

Example 1

A catalyst for use in a process of the present invention containing copper, molybdenum, and sulfur was produced, where at least a portion of the catalyst had a structure according to Formula (XVII).

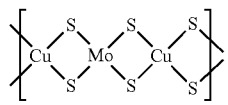

(XVII)

A 22-liter round-bottom flask was charged with a solution of 1199 grams of copper sulfate ($CuSO_4$) in 2 liters of water. The copper sulfate solution was heated to 85° C. 520.6 grams of ammonium tetrathiomolybdate (ATTM) $\{(NH_4)_2(MoS_4)\}$ in 13 liters of water was injected into the heated copper sulfate solution through an injection nozzle over a period of 4 hours while stirring the solution. After the addition was complete, the solution was stirred for 8 hours at 93° C. and then was allowed to cool and settle overnight.

Solids were then separated from the slurry. Separation of the solids from the slurry was accomplished using a centrifuge separator at 12,000 Gauss to give a red paste. The separated solids were washed with water until conductivity measurements of the effluent were under 100μ (Siemens at 33° C. Residual water was then removed from the solids by vacuum distillation at 55° C. and 29 inches of Hg pressure. 409 grams of catalyst solids were recovered. Semi-quantitative XRF (element, mass %) measured: Cu, 16.4; Mo, 35.6; S, 47.7; and less than 0.1 wt. % Fe and Co.

The catalyst solids were particulate having a particle size distribution with a mean particle size of 47.4 μm as determined by laser diffractometry using a Mastersizer S made by Malvern Instruments. The BET surface area of the catalyst was measured to be 113 $m^2/g$ and the catalyst pore volume was measured to be 0.157 $cm^3/g$. The catalyst had a pore size distribution, where the median pore size diameter was determined to be 56 angstroms. X-ray diffraction and Raman IR spectroscopy confirmed that at least a portion of the catalyst had a structure in which copper, sulfur, and molybdenum were arranged as shown in Formula (XVII) above.

Example 2

Bitumen from Peace River, Canada was selected as a hydrocarbon-containing feedstock for cracking. The Peace River bitumen was analyzed to determine its composition. The properties of the Peace River bitumen are set forth in Table 1:

TABLE 1

| Property | Value |
|---|---|
| Hydrogen (wt. %) | 10.1 |
| Carbon (wt. %) | 82 |
| Oxygen (wt. %) | 0.62 |
| Nitrogen (wt. %) | 0.37 |
| Sulfur (wt. %) | 6.69 |
| Nickel (wppm) | 70 |
| Vanadium (wppm) | 205 |
| Microcarbon residue (wt. %) | 12.5 |
| C5 asphaltenes (wt. %) | 10.9 |
| Density (g/ml) | 1.01 |

TABLE 1-continued

| Property | Value |
|---|---|
| Viscosity at 38° C. (cSt) | 8357 |
| TAN-E (ASTM D664) (mg KOH/g) | 3.91 |
| Boiling Range Distribution | |
| Initial Boiling Point-204° C. (400° F.)(wt. %) [Naphtha] | 0 |
| 204° C. (400° F.)-260° C. (500° F.) (wt. %) [Kerosene] | 1 |
| 260° C. (500° F.)-343° C. (650° F.) (wt. %) [Diesel] | 14 |
| 343° C. (650° F.)-538° C. (1000° F.) (wt. %) [VGO] | 37.5 |
| >538° C. (1000° F.) (wt. %) [Residue] | 47.5 |

Six samples of the Peace River bitumen were separately hydrocracked by mixing each bitumen sample with the catalyst prepared in Example 1, hydrogen, and hydrogen sulfide. The bitumen samples, catalyst, hydrogen, and hydrogen sulfide were mixed at selected temperatures, gas flow rates, hydrogen partial pressures, hydrogen sulfide partial pressures, feed uptake rates, and space velocities, as set forth in Table 2 below. The total pressure of each hydrocracking treatment was maintained at 13.1 MPa, where the hydrogen partial pressure of the treatments ranged from 8.8 MPa to 10.2 MPa, and the hydrogen sulfide partial pressure ranged from 2.9 MPa to 4.3 MPa. The total gas flow rate of each hydrocracking treatment was maintained at 950 standard liters per hour, where the hydrogen flow rate of the treatements ranged from 640-720 standard liters per hour and the hydrogen sulfide flow rate of the treatments ranged from 210-310 standard liters per hour. The liquid hourly space velocity of the bitumen feed for hydrocracking depended on the reaction rate, and ranged from 0.6 to 0.8 $hr^{-1}$. A target temperature was selected for each hydrocracking treatment within the range of 420° C. to 450° C. The conditions for each hydrocracking treatment of the six samples are shown below in Table 2.

In the hydrocracking treatment of each sample, the Peace River bitumen was preheated to approximately 105° C.-115° C. in a 10 gallon feed drum and circulated through a closed feed loop system from which the bitumen was fed into a semi-continuous stirred tank reactor with vapor effluent capability, where the reactor had an internal volume capacity of 1000 $cm^3$. The reactor was operated in a continuous mode with respect to the bitumen feedstream and the vapor effluent product, however, the reactor did not include a bleed stream to remove accumulating metals and/or carbonaceous solids. The bitumen feed of each sample was fed to the reactor as needed to maintain a working volume of feed in the reactor of approximately 475 ml, where a Berthold single-point source nuclear level detector located outside the reactor was used to control the working volume in the reactor. 50 grams of the catalyst was mixed with the hydrogen, hydrogen sulfide, and bitumen feed sample in the reactor during the course of the hydrocracking treatment. The bitumen feed sample, hydrogen, hydrogen sulfide, and the catalyst were mixed together in the reactor by stirring with an Autoclave Engineers MagneDrive® impeller at 1200 rpm. Vaporized product exited the reactor, where a liquid product was separated from the vaporized product by passing the vaporized product through a high pressure separator operated at reaction pressure and 80° C. and then through a low pressure separator operated at 0.17 MPa and 80° C. to separate the liquid product from non-condensable gases. Each hydrocracking treatment was halted when the quantity of solids accumulating in the reactor as a byproduct of the hydrocracking reaction halted the impeller stirring by breaking the magnetic coupling of the internal mixer magnet with the external mixing magnet.

The hydrocracking conditions and liquid product characteristics for each sample are shown in Table 2:

TABLE 2

|  | Sample 1 | Sample 2 | Sample 3 | Sample 4 | Sample 5 |
| --- | --- | --- | --- | --- | --- |
| Catalyst loaded (g) | 50 | 50 | 50 | 50 | 50 |
| Temperature (° C.) | 428 | 426 | 435 | 454 | 454 |
| Total pressure (MPa) | 13.1 | 13.1 | 13.1 | 13.1 | 13.1 |
| $H_2$ flow rate (SLPH) | 952 | 952 | 952 | 952 | 949 |
| $H_2$ partial pressure (MPa) | 9.4 | 8.9 | 9.3 | 8.8 | 8.8 |
| $H_2S$ partial pressure (MPa) | 3.7 | 4.1 | 3.8 | 4.3 | 4.3 |
| Bitumen feed rate (g/h) | 250 | 250 | 305 | 400 | 425 |
| Total liquid in (kg) | 36.4 | 20.6 | 30.4 | 17.2 | 17.8 |
| Total liquid out (kg) | 29.9 | 17.5 | 24.9 | 14.7 | 14.1 |
| Liquid recovery (wt. %) | 82.1 | 85.0 | 82.0 | 85.2 | 79.0 |
| Product density (g/cm$^3$) | 0.9326 | 0.9268 | 0.9284 | 0.9234 | 0.9235 |
| Product API Gravity (15.6° C.) | 20.2 | 21.2 | 20.9 | 21.8 | 21.7 |
| Product viscosity (cSt)(15.6° C.) | 24.3 | 22.1 | 19.7 | 10.3 | 10.4 |
| Product carbon content (wt. %) | 84.8 | 84.8 | 85.1 | 85.0 | 85.4 |
| Product sulfur content (wt. %) | 3.4 | 3.4 | 3.2 | 3.3 | 3.2 |
| Product nitrogen content (wt. %) | 0.3 | 0.3 | 0.3 | 0.3 | 0.3 |
| Boiling point fractions (wt. %-- Simulated Distillation as per ASTM D5307) | | | | | |
| Initial boiling point - 204° C. (IBP - 400° F.) | 8.5 | 9.0 | 10.5 | 15.5 | 16.0 |
| 204° C.-260° C. (400° F.-500° F.) | 10.5 | 11.0 | 11.5 | 14.5 | 14.5 |
| 260° C.-343° C. (500° F.-650° F.) | 31.0 | 31.0 | 29.5 | 31.0 | 30.5 |
| 343° C.-538° C. (650° F.-1000° F.) | 48.5 | 47.5 | 47.0 | 37.5 | 38.0 |
| 538° C.+ (1000° F.+) | 1.5 | 1.5 | 1.5 | 1.5 | 1.0 |

The liquid products of samples 1 and 2 were combined and the combined liquid product was then analyzed by GC-GC sulfur chemiluminesence to determine the carbon number of sulfur-containing hydrocarbons in the combined liquid product of hydrocarbons having a carbon number from 6 to 17 and of hydrocarbons having a carbon number of 18 or higher, and to determine the type of sulfur-containing hydrocarbons contained in the combined liquid product. The results are shown in Table 3, where non-benzothiophenes include sulfides, thiols, disulfides, thiophenes, arylsulfides, benzonaphthothiophenes, and naphthenic benzonaphthothiophenes, and where benzothiophenes include benzothiophene, naphthenic benzothiophenes, di-benzothiophenes, and naphthenic di-benzothiophenes. Sulfur-containing hydrocarbons for which a carbon number could not be determined are shown as having an indeterminate carbon number in Table 3.

As shown in Table 3, the hydrocracking treatment provided a hydrocarbon composition in which a significant portion of the sulfur in the composition was contained in relatively low carbon number hydrocarbons. These low carbon number heteroatomic hydrocarbons generally have a low molecular weight relative to the sulfur containing hydrocarbons having a carbon number of 18 or greater, and generally are contained in the naphtha and distillate boiling fractions, not the high molecular weight, high boiling residue and asphaltene fractions in which sulfur-containing hydrocarbons are more refractory.

The combined liquid product was then analyzed by flame ionization detection-two dimensional gas chromatography (GCxGC-FID) to determine the monoaromatic, diaromatic, and polyaromatic hydrocarbon (3 or more aromatic rings) content of the combined liquid product. Mono-aromatic compounds included mono-aromatics and naphthenic mono-aro-

TABLE 3

| | Non-benzothiophenic compounds | Benzothiophenic compounds | Total | % of total | % benzothiophenic compounds in fraction |
| --- | --- | --- | --- | --- | --- |
| C6-C17 S-containing hydrocarbons (wppm S) | 4554 | 17213 | 21767 | 62.9 | 79.1 |
| C18 and greater S-containing hydrocarbons (wppm S) | 1425 | 1382 | 2807 | 8.1 | |
| Indetermine C-number S-containing hydrocarbons (wppm S) | 3835 | 6194 | 10029 | 29.0 | | matics, di-aromatic compounds included di-aromatics and naphthenic di-aromatics, and polyaromatics included polyaromatic compounds and naphthenic polyaromatic compounds. The results are shown in Table 4:

TABLE 4

|   | Mono-aromatic compounds | Di-aromatic compounds | Combined mono-aromatic and di-aromatic compounds | Poly-aromatic compounds | Total Aromatic compounds |
|---|---|---|---|---|---|
| wt. % of composition | 19.1 | 23.2 | 42.3 | 22.2 | 64.5 |

As shown in Table 4, the hydrocracking treatment provided a hydrocarbon composition that had a significant quantity of mono-aromatic and di-aromatic hydrocarbon compounds relative to the polyaromatic hydrocarbon compounds, where the weight ratio of the combined mono-aromatic and di-aromatic hydrocarbon compounds relative to the polyaromatic hydrocarbon compounds was 1.9:1.

Example 3

Another catalyst was prepared, where at least a portion of the catalyst had the structure as shown in formula (XVII) above. 781 grams of ammonium tetrathiomolybdate was mixed with 636 grams of $Na_2CO_3$ in 6 liters of water while stiffing. The resulting solution was heated to 70° C. and then stirred for three hours to produce a solution of $Na_2MoS_4$. The $Na_2MoS_4$ solution was then permitted to cool overnight. A second solution was prepared by mixing 1498 grams of $CuSO_4 5H_2O$ in 6 liters of water. The $CuSO_4$ solution was then added to the $Na_2MoS_4$ solution via pneumatic pump through a 0.02"×0.5" nozzle while stirring the mixture at ambient temperature. The mixture was stirred for two hours, and then the resulting solids were separated by centrifuge. 880 grams of solid particulate catalyst was recovered. The solids were then washed with water until the effluent from the wash had a conductivity of 488 μS at 33° C. The catalyst solids were particulate and had a particle size distribution with a mean particle size of 8.5 μm as determined by laser diffractometry using a Mastersizer S (Malvern Instruments). The BET surface area of the catalyst solids was measured to be 29.3 m²/g. Semi-quantitative XRF of the catalyst solids indicated that the catalyst solids contained 45.867 mass % Cu, 18.587 mass % Mo, and 27.527 mass % S. X-ray diffraction and Raman IR spectroscopy confirmed that at least a portion of the catalyst had a structure in which copper, molybdenum, and sulfur were arranged as shown in formula (XVII) above.

Example 4

Peace River bitumen having the composition shown in Table 1 above was hydrocracked in a process in accordance with the present invention using different hydrogen sulfide levels to determine the effect of hydrogen sulfide on the rate of the hydrocracking reaction. Hydrogen sulfide was provided at 5 mol %, 11.4 mol %, and 20.1 mol % of the gas fed to the reactor. Hydrogen was provided at 70 mol % of the gas fed to the reactor when hydrogen sulfide was provided at 5 mol % (mole ratio of 1:14, hydrogen sulfide:hydrogen); 68.6 mol % of the gas fed to the reactor when hydrogen sulfide was provided at 11.4 mol % (mole ratio of 1:6, hydrogen sulfide: hydrogen); and 69.9 mol % of the gas fed to the reactor when hydrogen sulfide was provided at 20.1 mol % (mole ratio of 1:3.5, hydrogen sulfide:hydrogen). A control hydrocracking reaction was also run at 0 mol % hydrogen sulfide and 70.2 mol % hydrogen. Nitrogen was provided as an inert gas in the gas fed to the reactor to maintain the total pressure of the reaction at 8.3 MPa, where nitrogen was provided as 25 mol % of the gas fed to the reactor when hydrogen sulfide was provided at 5 mol % of the gas fed to the reactor; as 20 mol % of the gas fed to the reactor when hydrogen sulfide was provided at 11.4 mol % of the gas fed to the reactor; as 10 mol % of the gas fed to the reactor when hydrogen sulfide was provided at 20.1 mol % of the gas fed to the reactor; and as 29.8 mol % of the gas fed to the reactor in the control. Hydrogen and hydrogen sulfide provided 75% of the total pressure in the reaction when hydrogen sulfide was provided at 5 mol % of the gas fed to the reactor, and provided 80% of the total pressure when hydrogen sulfide was provided at 11.4 mol % and 20.1 mol % of the gas fed to the reactor.

Four samples of the Peace River bitumen were hydrocracked, one each at the above specified hydrogen sulfide: hydrogen: nitrogen levels. The hydrocracking conditions were the same as specified above for Example 2 except that the catalyst that was used was the catalyst prepared in Example 3, the total pressure was maintained at 8.3 MPa, hydrogen sulfide and hydrogen partial pressures depended on the amount of each provided to each of the hydrocracking reactions as set forth above, the temperature was 430° C. for each of the hydrocracking reactions, the gas flow rate was maintained at 900 standard liters per hour, and the working volume of feed in the reactor was maintained at 500 ml.

The rate of the production of hydrocracked product was measured for each of the samples. The results are shown in Table 5:

TABLE 5

|  | Time [hrs] | | | |
|---|---|---|---|---|
|  | 5 | 10 | 15 | 20 |
| [mol %] $H_2S$ | Rate [Kg/h · m³] | | | |
| 0.0% | 370 | 335 | 300 | 265 |
| 5.0% | 403 | 370 | 338 | 305 |
| 11.4% | 426 | 394 | 361 | 329 |
| 20.1% | 448 | 418 | 387 | 357 |

Figure 3:
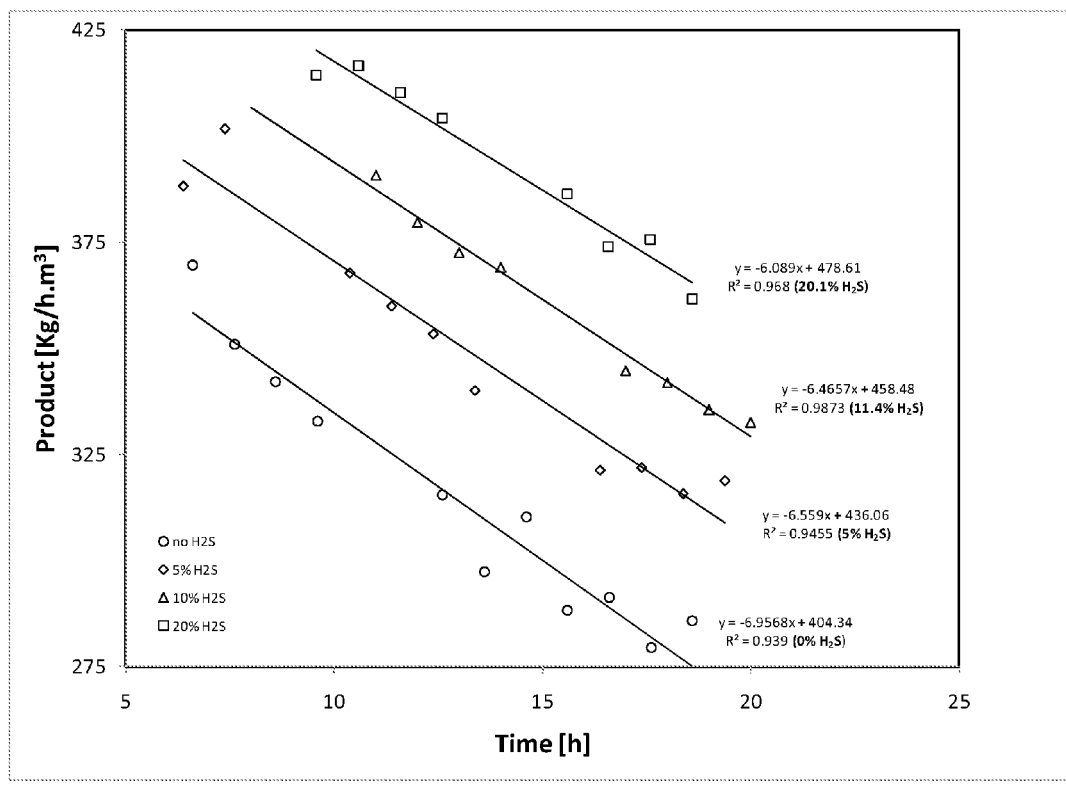
FIG. 3 is a plot of hydrocracking reaction rates relative to hydrogen sulfide present in the reaction.

A graphic depiction of the rate of production of product in each of the hydrocracking reactions is shown in FIG. 3.

As shown in Table 5 and FIG. 3, the rate of production of product in the hydrocracking reactions at constant temperature and pressure increases as the quantity of hydrogen sulfide in the reaction mixture increases. It is believed that the rate will increase further at each hydrogen sulfide partial pressure, respectively, as temperature and total pressure are increased, for example, to 450° C. and 13.8 MPa. The rate of the reaction is maintained above 350 kg/h-m³ for a sustained period when hydrogen sulfide is present in an amount relative to hydrogen of at least 1:14 where the hydrogen sulfide and hydrogen provide at least 60% of the total pressure in the reaction, and is sustained for a longer period as the hydrogen sulfide levels increase.

Example 5

Another catalyst was prepared for use in a hydrocracking process of the present invention to determine the relative amount of liquid hydrocarbon product, coke, non-condensable gas, and hold-up produced by the process. A solution was prepared by mixing 780 grams of ammonium tetrathiomolybdate and 636 grams of $Na_2CO_3$ in 13.5 liters of deionized water. The solution was heated to 85° C. to generate $Na_2MoS_4$. A separate solution of $CuSO_4$ was prepared by mixing 2994 grams of $CuSO_4$ in 5 liters of water. The $CuSO_4$ solution was heated to 85° C. and added to the $Na_2MoS_4$ solution through a 0.0625" spray nozzle. The mixed solution was stirred at 85° C. for 2 hours and then at room temperature overnight. Solid catalyst material was then separated from the solution by centrifuge. The solid catalyst material was washed until the wash effluent had a pH of 7 and conductivity of 488 µS at 33° C. The solid catalyst material was then dried. 548 grams of glossy black catalyst solids were recovered.

The catalyst solids were particulate and had a particle size distribution with a mean particle size of between 400 and 500 nm as determined by laser diffractometry using a Mastersizer S. The BET surface area of the catalyst was measured to be 58 $m^2/g$. Semi-quantitative XRF indicated that the solid catalyst material contained 37.633 mass % Cu, 22.231 mass % Mo, 27.734 mass % S, and 0.503 mass % Na. X-ray diffraction and Raman IR spectroscopy confirmed that at least a portion of the catalyst solids had a structure in which copper, molybdenum, and sulfur were arranged as shown in formula (XVII) above.

Example 6

Peace River bitumen having the composition shown in Table 1 above was hydrocracked in a process in accordance with the present invention using gas containing 36.5 mol % hydrogen sulfide and 63.7 mol % hydrogen (mole ratio 1:1.75, hydrogen sulfide:hydrogen) to determine the relative amounts of liquid hydrocarbon product, non-compressible gas, and coke produced by the hydrocracking reaction. Hydrocracking conditions were the same as set forth in Example 2 except that the catalyst that was used in the process was the catalyst prepared in Example 5, the hydrogen sulfide partial pressure was 4.78 MPa, the temperature was 420° C., the gas flow rate was maintained at 948 standard liters per hour, the working volume of feed in the reactor was maintained at 500 ml, and the pressure in the low temperature separator was maintained at 1.38 MPa to improve the capture yield of condensable vapors.

Figure 4:
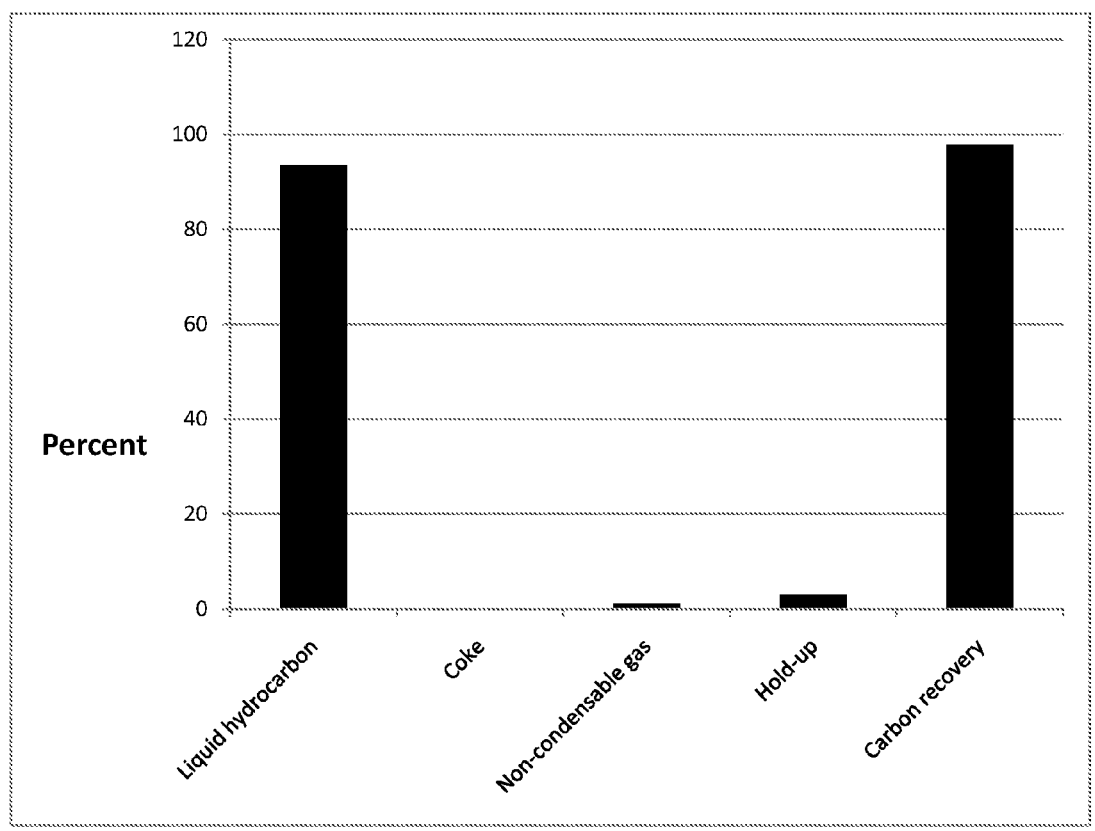
FIG. 4 is a graph of the carbon content of the products of a hydrocracking process conducted in accordance with the present invention.

The yield of liquid hydrocarbon product, non-condensable gas—including hydrogen, hydrogen sulfide, and hydrocarbons having a carbon number of from 1 to 6, coke, and hold-up were measured and compared with the carbon content of the feed provided. Hold-up included residual high molecular weight hydrocarbons that did not vaporize as product that were soluble in toluene (so not, by definition, coke) and metals. The results are shown in FIG. 4. 93.5% of the carbon content of the material produced by the hydrocracking reaction was captured as liquid hydrocarbon product; 0.1% of the carbon content was produced as coke, 1.2% of the carbon content was produced as non-condensable gas, and 3.1% of the carbon content was produced as hold-up, where 97.8% of the carbon content of the bitumen feed was captured in the combined liquid hydrocarbon product, non-condensable gas, coke, and hold-up.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

We claim:

1. A process for cracking a hydrocarbon-containing feedstock, comprising:
providing a hydrocarbon-containing feedstock to a mixing zone, where the hydrocarbon-containing feedstock is selected to contain at least 20 wt. % hydrocarbons having a boiling point of greater than 538° C. as determined in accordance with ASTM Method D5307;
providing at least one metal-containing catalyst to the mixing zone;
continuously or intermittently providing hydrogen to the mixing zone;
continuously or intermittently providing hydrogen sulfide to the mixing zone, where the hydrogen sulfide is provided to the mixing zone at a mole ratio of hydrogen sulfide to hydrogen of at least 0.5:9.5 up to 1:1;
blending the hydrogen, hydrogen sulfide, hydrocarbon-containing feedstock, and the catalyst(s) in the mixing zone at a temperature of from 375° C. to 500° C. and at a total pressure of from 6.9 MPa to 27.5 MPa—where hydrogen and hydrogen sulfide are provided for mixing such that the combined hydrogen and hydrogen sulfide partial pressures provide at least 60% of the total pressure—to produce:
a) a vapor comprised of hydrocarbons that are vaporizable at the temperature and the pressure within the mixing zone; and
b) a hydrocarbon-depleted feed residuum comprising hydrocarbons that are liquid at the temperature and pressure within the mixing zone;
continuously or intermittently separating at least a portion of the vapor from the mixing zone while retaining in the mixing zone at least a portion of the hydrocarbon-depleted feed residuum within the mixing zone, wherein the vapor separated from the mixing zone comprises at most 5 wt. % solids and liquids at the temperature at which the vapor is separated from the mixing zone; and apart from the mixing zone, condensing a liquid hydrocarbon-containing product that contains at least 90% of the atomic carbon initially contained in the hydrocarbon-containing feedstock and that contains less than 5 wt. % hydrocarbons having a boiling point of at least 538° C. as determined in accordance with ASTM Method D5307 from at least a portion of the vapor separated from the mixing zone.

2. The process of claim 1 wherein the hydrocarbon-containing feedstock and the hydrocarbon-depleted feed residuum are blended with hydrogen, hydrogen sulfide, and the catalyst(s) in the mixing zone while continuously separating at least a portion of the vapor from the mixing zone.

3. The method of claim 1 wherein any metal-containing catalyst provided to the mixing zone has an acidity as measured by ammonia chemisorption of at most 200 mmol ammonia per gram of catalyst.

4. The process of claim 1 wherein the catalyst comprises a metal of Column 6, 14, or of the Periodic Table or a compound containing a metal of Column(s) 6, 14, or 15 of the Periodic Table and a metal of Column(s) 3 or 7-15 of the Periodic Table or a compound containing a metal of Column(s) 3 or 7-15 of the Periodic Table.

5. The process of claim 1 wherein the catalyst is comprised of a material comprised of a first metal and a second metal where the first metal comprises a metal selected from the group consisting of Cu, Ni, Co, Fe, Ag, Mn, Zn, Sn, Ru, La, Ce, Pr, Sm, Eu, Yb, Lu, Dy, Pb, Sb, and Bi where the second metal comprises a metal selected from the group consisting of Mo, W, V, Sn and Sb, where the second metal is not the same as the first metal, and wherein at least a portion of the material of the catalyst has a structure according to a formula selected from the group consisting of formula (VII), formula (IX), formula (XII), and formula (XIV):

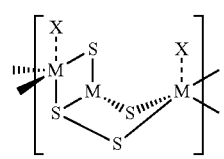
(VII)

where M is either the first metal or the second metal, and at least one M is the first metal and at least one M is the second metal;

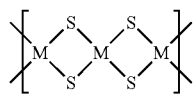
(IX)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$;

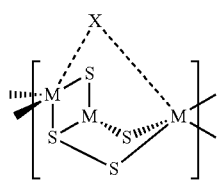
(XII)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$;

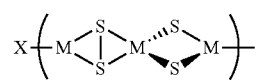
(XIV)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$.

6. The process of claim 1 wherein the catalyst is comprised of a material comprised of a first metal and a second metal where the first metal comprises a metal selected from the group consisting of Cu, Ni, Co, Fe, Ag, Mn, Zn, Sn, Ru, La, Ce, Pr, Sm, Eu, Yb, Lu, Dy, Pb, Sb, and Bi, where the second metal comprises a metal selected from the group consisting of Mo, W, V, Sn, and Sb, where the second metal is not the same as the first metal, and wherein the material is comprised of at least three linked chain elements, the chain elements comprising a first chain element including the first metal and having a structure according to formula (I) and a second chain element including the second metal and having a structure according to formula (II)

(I)

where $M^1$ is the first metal

(II)

where $M^2$ is the second metal where at least one chain element in the material is a first chain element and at least one chain element in the material is a second chain element, and where chain elements in the material are linked by bonds between the two sulfur atoms of a chain element and the metal of an adjacent chain element.

7. The method of claim 1 wherein the metal-containing catalyst is a solid particulate material having a particle size distribution having a median particle size or a mean particle size of from 50 nm to 5 μm.

8. The process of claim 1 further comprising the steps of:
separating a stream containing liquids and solids from the mixing zone;

separating solids from the stream containing liquids and solids to produce a liquid stream and a solid material; and providing the liquid stream to the mixing zone.

9. The process of claim 1 wherein the hydrogen sulfide is provided to the mixing zone at a mole ratio of hydrogen sulfide to hydrogen of at least 1:10.

10. The process of claim 1 wherein the hydrocarbon-containing feedstock is continuously provided to the mixing zone, hydrogen is continuously provided to the mixing zone, hydrogen sulfide is continuously provided to the mixing zone, at least a portion of the vapor is continuously separated from the mixing zone, and the hydrocarbon-containing feedstock, the hydrocarbon-depleted feed residuum, hydrogen, hydrogen sulfide, and the catalyst are blended in the mixing zone for a period of at least 45 hours.

11. The process of claim 1 wherein the hydrocarbon-containing feedstock contains at least 30 wt. % of hydrocarbons having a boiling point of greater than 538° C. as determined in accordance with ASTM Method D5307.

12. The process of claim 1 wherein the hydrocarbon-containing feedstock contains at least 30 wt. %, of hydrocarbons having a boiling point of 538° C. or less as determined in accordance with ASTM Method D5307.

13. The process of claim 1 wherein the temperature in the mixing zone is selected and controlled to be at least 430° C.

14. The process of claim 1 wherein the hydrocarbon-containing product condensed from the vapor separated from the mixing zone contains at most 1 wt. % coke as determined in accordance with ASTM Method 4072.

15. The process of claim 1 wherein the hydrocarbon-containing product condensed from the vapor separated from the mixing zone contains at least 40% of the atomic sulfur present in the hydrocarbon-containing feedstock wherein at least 40 wt. % of the sulfur is contained in hydrocarbon compounds having a carbon number of 17 or less as determined by two-dimensional GC-GC sulfur chemiluminscence.

16. The process of claim 1 wherein the hydrocarbon-containing product condensed from the vapor separated from the mixing zone contains at least 40% of the atomic nitrogen present in the hydrocarbon-containing feedstock wherein at least 30 wt. % of the nitrogen in the hydrocarbon composition is contained in nitrogen-containing hydrocarbon compounds having a carbon number of 17 or less.

17. The process of claim 1 wherein the hydrocarbon-containing product contains at most 0.001 wt. % vanadium and at most 0.001 wt. % nickel.

18. The process of claim 1 wherein the combined volume of the hydrocarbon-depleted feed residuum, the catalyst(s), and the hydrocarbon-containing feedstock in the mixing zone defines a mixture volume in the mixing zone, and the hydrocarbon-containing feedstock is provided to the mixing zone at a rate selected to be at least 350 kg/hr per m$^3$ of the mixture volume in the mixing zone.

19. The process of claim 18 wherein the mixing zone is located in a reactor;

the reactor has a reactor volume;

the combined volume of the hydrocarbon-containing feedstock and the catalyst(s) initially provided to the mixing zone defines an initial mixture volume, where the initial mixture volume is from 5% to 97% of the reactor volume;

and where the mixture volume of the catalyst, the hydrocarbon-depleted feed residuum, and the hydrocarbon-containing feed is maintained at a level of from 10% to 1940% of the initial mixture volume.

20. The process of claim 1 wherein the hydrocarbon-depleted feed residuum contains less than 0.02 grams of substances insoluble in toluene as determined in accordance with ASTM Method D4072, excluding the catalyst, per gram of hydrocarbon-containing feedstock provided to the mixing zone.

* * * * *